(12) United States Patent
Kim et al.

(10) Patent No.: US 8,190,188 B2
(45) Date of Patent: May 29, 2012

(54) METHOD AND APPARATUS FOR TRANSMITTING AND RECEIVING INFORMATION ABOUT FORWARD CHANNEL STATUS IN A MULTI-CARRIER MOBILE COMMUNICATION SYSTEM

(75) Inventors: Youn-Sun Kim, Seoul (KR); Ho-Kyu Choi, Songnam-shi (KR); Hwan-Joon Kwon, Seoul (KR); Dong-hae Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 360 days.

(21) Appl. No.: 12/547,097

(22) Filed: Aug. 25, 2009

(65) Prior Publication Data
US 2009/0310507 A1    Dec. 17, 2009

Related U.S. Application Data

(62) Division of application No. 10/345,557, filed on Jan. 16, 2003, now abandoned.

(30) Foreign Application Priority Data

Jan. 16, 2002    (KR) ................................. P2002-2570

(51) Int. Cl.
     *H04B 7/00*           (2006.01)
(52) U.S. Cl. .................. 455/522; 455/115.1; 455/115.3; 455/134; 370/332
(58) Field of Classification Search .............. 455/69, 455/522, 404.1, 414.1, 566, 127.1, 13.4, 455/437, 442, 525, 436, 439, 421, 443, 440, 455/441, 33.1, 33.4, 34.1, 56.1, 67.5, 101, 227.1, 67.11, 517, 67.13, 420, 425, 424, 561, 550, 576.1, 456.5, 456.6, 562, 115.1, 115.3, 134; 370/235, 329, 335, 282, 252, 331, 332, 333, 328, 342, 465; 375/260
See application file for complete search history.

(56) References Cited

U.S. PATENT DOCUMENTS

| | | | |
|---|---|---|---|
| 5,715,516 A * | 2/1998 | Howard et al. | 455/422.1 |
| 5,799,012 A * | 8/1998 | Ayerst et al. | 370/336 |
| 5,943,610 A | 8/1999 | Endo | |
| 6,035,196 A * | 3/2000 | Hengeveld et al. | 455/437 |
| 6,144,861 A | 11/2000 | Sundelin et al. | |
| 6,285,663 B1 | 9/2001 | Esmailzadeh | |
| 6,304,562 B1 * | 10/2001 | Kim et al. | 370/332 |
| 6,434,367 B1 | 8/2002 | Kumar et al. | |
| 6,633,553 B1 * | 10/2003 | Hwang | 370/329 |
| 7,010,322 B2 | 3/2006 | Kim et al. | |
| 2001/0046219 A1 | 11/2001 | Kitade et al. | |

(Continued)

FOREIGN PATENT DOCUMENTS

EP      0 991 204      4/2000

(Continued)

*Primary Examiner* — Tan Trinh
(74) *Attorney, Agent, or Firm* — The Farrell Law Firm, P.C.

(57) ABSTRACT

A method and apparatus for transmitting and receiving forward channel status information in a multi-carrier mobile communication system. An MS transmits to a BS forward channel status information representing an average C/I of forward signals with respect to a plurality of carriers, the maximum of the forward signal C/Is, or each of the forward signal C/Is. The forward channel status information is absolute C/I information representing a current C/I, or relative C/I information representing a difference of the current C/I from a previous C/I.

17 Claims, 19 Drawing Sheets

U.S. PATENT DOCUMENTS

| | | |
|---|---|---|
| 2003/0013476 A1 | 1/2003 | Park et al. |
| 2003/0083092 A1 | 5/2003 | Kim et al. |
| 2003/0148738 A1 | 8/2003 | Das et al. |
| 2003/0157900 A1 | 8/2003 | Gaal et al. |

FOREIGN PATENT DOCUMENTS

| | | |
|---|---|---|
| WO | WO 99/23844 | 5/1999 |
| WO | WO 00/65744 | 11/2000 |

* cited by examiner

METHOD AND APPARATUS FOR TRANSMITTING AND RECEIVING INFORMATION ABOUT FORWARD CHANNEL STATUS IN A MULTI-CARRIER MOBILE COMMUNICATION SYSTEM

PRIORITY

This application is a divisional of and claims priority under 35 U.S.C. 121 to U.S. application Ser. No. 10/345,557 filed in the U.S. Patent and Trademark Office on Jan. 16, 2003, the contents of which are incorporated herein by reference. This application claims priority to an application entitled "Method and Apparatus for Transmitting and Receiving Information about Forward Channel Status in a Multi-Carrier Mobile Communication System" filed in the Korean Industrial Property Office on Jan. 16, 2002 and assigned Serial No. 2002-2570, the contents of which are incorporated herein by reference.

BACKGROUND OF THE INVENTION

1. Field of the Invention

The present invention relates generally to a mobile communication system supporting voice and data services, and in particular, to a method and apparatus for efficiently transmitting information about the status of a forward channel from a mobile station (MS) in a multi-carrier mobile communication system.

2. Description of the Related Art

A typical mobile communication system such as CDMA (Code Division Multiple Access) provides only a voice service. However, growing user demand and development of mobile communication technology have led to mobile communication systems that additionally provide a data service. One of them is a so-called 1xEV-DV (Evolution-Data and Voice) system.

In the 1xEV-DV mobile communication system, a plurality of MSs report to a base station (BS) measurements of the status of a forward channel from the BS by R-CQICHs (Reverse-Channel Quality Indicator Channels) and the BS then determines an MS to receive forward packet data and its related transmission parameters based on the forward channel status measurements. Here, the forward channel status is measured as the carrier-to-interference ratio (C/I) of a forward pilot channel from the BS.

FIG. 1 is a block diagram of an R-CQICH transmitter in a typical 1xEV-DV mobile communication system. Referring to FIG. 1, a C/I measurer 101 measures the C/I of a forward pilot channel signal and a C/I information generator 102 generates C/I information in a predetermined number of bits by quantizing the C/I measurement. Mapping of C/I measurements to C/I information is illustrated in Table 1 below.

TABLE 1

| C/I measurement of forward pilot | C/I information (a4, a3, a2, a1, a0) |
|---|---|
| NULL (below −14.5 dB or MS not ready) | 00000 |
| −14.5 to −13.1 dB | 00001 |
| −13.1 to −11.6 dB | 00010 |
| −11.6 to −10.2 dB | 00011 |
| −10.2 to −8.8 dB | 00100 |
| −8.8 to −7.4 dB | 00101 |
| −7.4 to −5.9 dB | 00110 |
| −5.9 to −4.5 dB | 00111 |
| −4.5 to −3.1 dB | 01000 |

TABLE 1-continued

| C/I measurement of forward pilot | C/I information (a4, a3, a2, a1, a0) |
|---|---|
| −3.1 to −1.6 dB | 01001 |
| −1.6 to −0.2 dB | 01010 |
| −0.2 to 1.2 dB | 01011 |
| 1.2 to 2.6 dB | 01100 |
| 2.6 to 4.1 dB | 01101 |
| 4.1 to 5.5 dB | 01110 |
| Above 5.5 dB | 01111 |

In Table 1, one bit in the position of a4 is reserved. Therefore, the C/I information is represented actually in 4 bits.

A block encoder 103 encodes the C/I information at a coding rate of (12, 5). A Walsh coverer 104 covers the 12 code symbols received from the block encoder 103 with a Walsh code of length 8. The Walsh code is determined according to a 3-bit best sector indicator (BSI). The BSI indicates a BS (i.e. sector) in the best forward channel status in an active set listing BSs (sectors in a sectored BS) communicating with an MS.

A Walsh spreader 105 spreads the 96-bit Walsh covered sequence received from the Walsh coverer 104 with a Walsh code assigned to an R-CQICH and transmits the spread signal to the BS.

The 4-bit C/I information and the one reserved bit are transmitted in every reverse channel slot of 1.25 ms. The C/I information is equivalent to 3200 bps and each MS that is to receive a packet data service transmits C/I information to the BS. This C/I information transmission uses a large amount of reverse transmission capacity that might otherwise be used for transmission of traffic data.

Moreover, the R-CQICH configuration is applicable only up to a 2xEV-DV system using a single carrier. An advanced 3xEV-DV system uses multiple carriers to increase system efficiency and the multiple carriers are in different forward channel statuses. Therefore, there is a need for a preferable method of transmitting forward channel status information in a multi-carrier mobile communication system.

SUMMARY OF THE INVENTION

It is, therefore, an object of the present invention to provide a method and apparatus for effectively transmitting information about a forward channel status in a multi-carrier mobile communication system.

It is another object of the present invention to provide a method and apparatus for effectively transmitting information about a forward channel status with minimum reverse transmission capacity in a multi-carrier mobile communication system.

To achieve the above and other objects, according to an aspect of the present invention, an MS transmits to a BS forward channel status information representing an average C/I of forward signals with respect to a plurality of carriers. The BS then controls transmission of forward packet data to the MS based on the average C/I.

According to another aspect of the present invention, an MS transmits to a BS forward channel status information representing a maximum C/I of forward signals with respect to a plurality of carriers. The BS then controls transmission of forward packet data to the MS based on the maximum C/I.

According to a further aspect of the present invention, an MS transmits to a BS forward channel status information representing each C/I of forward signals with respect to a plurality of carriers. The BS then controls transmission of forward packet data to the MS based on the individual C/I.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The R-CQICH delivers information about a forward channel status from an MS to a BS, and a 3xEV-DV mobile communication system uses a plurality of forward carriers spread to 1.2288 Mcps (Mega chips per second) and one reverse carrier spread to 1.2288 or 3.6864 Mcps for the purpose of efficient packet data transmission and reception. Exemplary forward and reverse frequency assignments in the 3xEV-DV system are illustrated in FIGS. 2 and 3.

Figure 2:
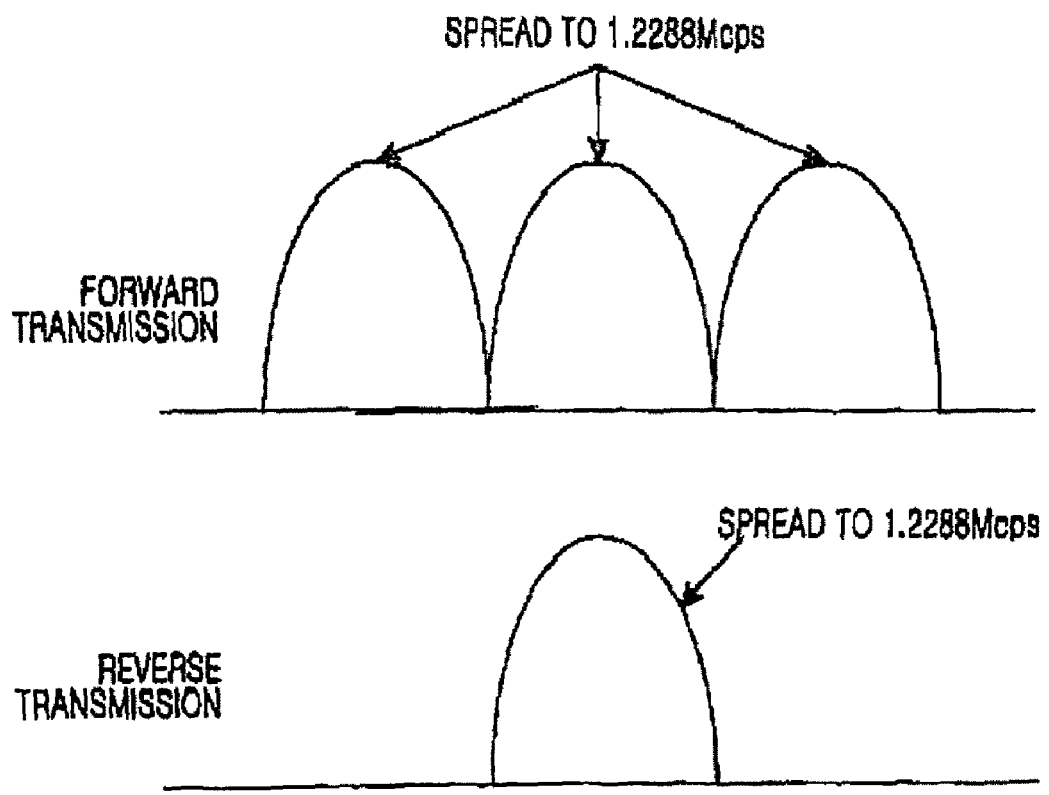
FIG. 2 illustrates assignment of three forward carriers and one reverse carrier.
Figure 3:
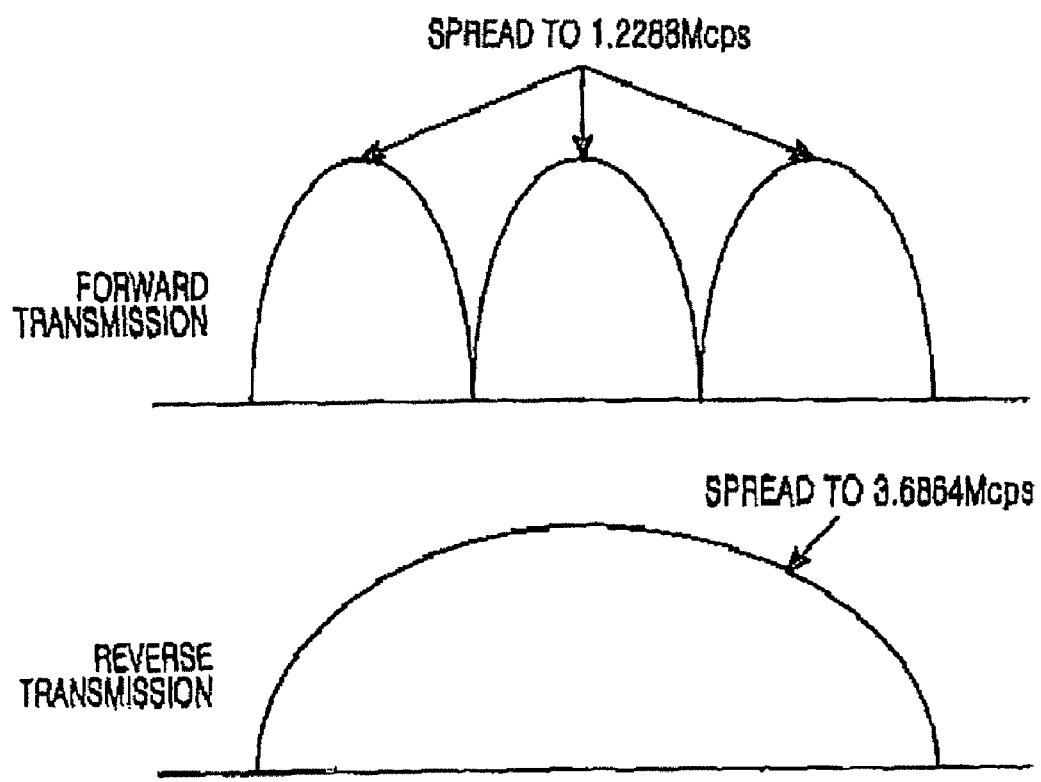
FIG. 3 illustrates frequency assignment to three forward carriers and one reverse carrier.

FIG. 2 illustrates three forward carriers, each being spread to 1.2288 Mcps and one reverse carrier spread to 1.2288 Mcps, and FIG. 3 illustrates three forward carriers, each being spread to 1.2288 Mcps and one reverse carrier spread to 3.6864 Mcps. If two or more carries are assigned on the forward link as illustrated in FIGS. 2 and 3, it is necessary to measure the forward channel states of each carrier and report them. The requirement for this operation is transmission of accurate forward channel status information, minimizing R-CQICH-incurred interference.

In a multi-carrier mobile communication system, each BS (or each sector) transmits signals by a plurality of carriers. An MS receives forward pilot channel signals from all possible BSs and selects the best sector, which has the strongest pilot channel among them. The best sector can be determined in many methods. One method is that the MS calculates an average strength of the forward pilot channel signals received on a plurality of carriers from each sector and selects a sector having a maximum signal strength as the best sector. Another method is to select as the best sector a sector transmitting a strongest pilot channel signal among all possible sectors, each sector transmitting pilot channels by a plurality of carriers.

The MS measures the forward channel status using a plurality of pilot channel signals from the best sector and generates forward channel status information based on the measurement. Therefore, it is to be understood in the following description that the best sector is a sector from which the MS receives signals to generate forward status information with respect to a plurality of carriers. The MS transmits the forward channel status information to all neighbor sectors including the best sector in order to ensure continuity of packet data at handoff. However, for clarity of description, it will be described herein that the MS transmits the forward channel status information to the best sector.

First Embodiment

In a first embodiment of the present invention, an MS calculates an average of the strengths of forward channel signals with respect to a plurality of carriers and generates forward channel status information based on the average strength.

Figure 4:
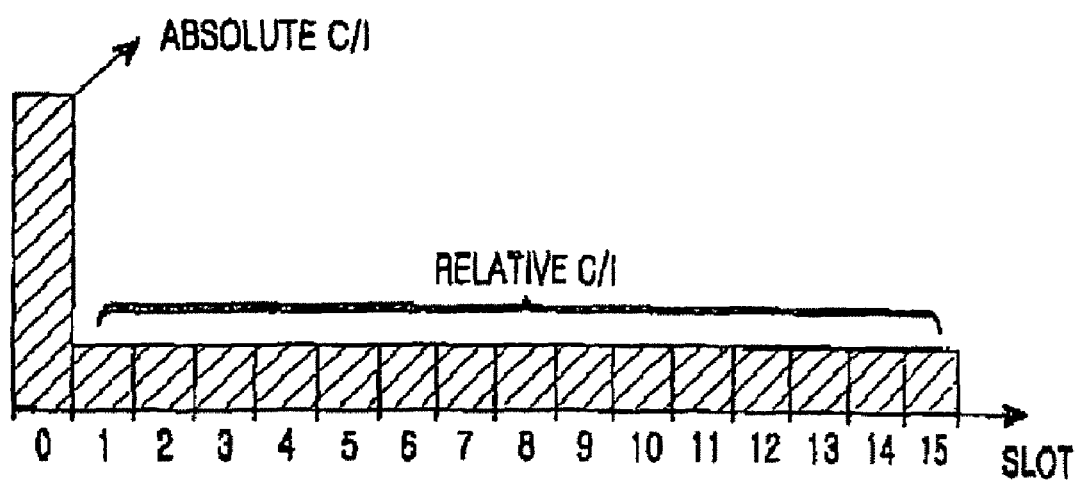
FIG. 4 illustrates an R-CQICH slot format for 3xEV-DV according to an embodiment of the present invention.

FIG. 4 illustrates an R-CQICH slot format for 3xEV-DV according to the first embodiment of the present invention. The R-CQICH delivers the absolute information and relative information of the average signal strength. The absolute information and the relative information will be referred to as an absolute C/I and a relative C/I, respectively. The absolute C/I is a quantized C/I measurement of a forward channel signal in the current slot, and the relative C/I represents a difference in the forward channel signal strength of the current slot from a previous slot. If absolute C/I information is formed as illustrated in Table 1, the absolute C/I information occupies 4 bits and relative C/I information occupies 1 bit. An increment or decrement represented by the relative C/I information is preset, for example, to be 1 dB between the MS and the BS.

As illustrated in FIG. 4, the MS measures the C/I of the forward pilot channel signal in every slot #0 and generates 4-bit absolute C/I information. In each of the other slots #1 to #15, the MS generates 1-bit relative C/I information by comparing the C/I measurement of the slot with that of its previous slot. In this manner, the MS generates absolute C/I information every 16 slots and relative C/I information in the other slots, and transmits them in corresponding slots on the R-CQICH. Here, the absolute C/I information is transmitted with stronger power than the relative C/I information, for example, twice as much power.

While the absolute C/I information is transmitted every 16 slots in FIG. 4, its transmission period is determined according to system parameters set between the MS and the BS. The slot position of the absolute C/I information is also selected between the MS and the BS.

The MS measures the C/I of the forward pilot channel signal with respect to each of the carriers received from the BS, calculates an average of the C/I measurements, and generates absolute C/I and relative C/I information based on the average C/I. More specifically, the MS averages the forward pilot channel measurements with respect to the carriers in slot #0 and generates absolute C/I information by quantizing the average C/I. The MS operates in the same manner in each of the other slots, and generates relative C/I information by comparing the absolute C/I of each of the slots and that of its previous slot. The MS then transmits the absolute C/I information and the relative C/I information on the R-CQICH, thereby reporting the channel statuses of all the carriers to the BS, while minimizing R-CQICH-caused interference.

Figure 1:
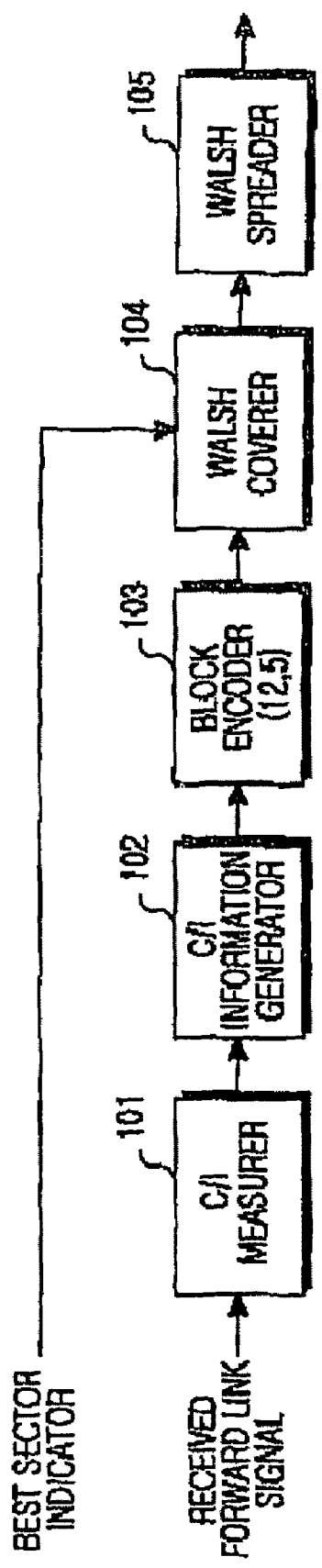
FIG. 1 is a block diagram of an R-CQICH transmitter in a typical 1xEV-DV mobile communication system.

While 64(=4×16) bits are used to deliver the forward channel status information in every 16 slots in the conventional R-CQICH transmission method illustrated in FIG. 1, only 19 (=4+1×15) bits are used in the embodiment of the present invention.

In FIG. 4, a single MS transmits forward channel status information every 16 slots. If two or more MSs transmit forward channel status information to the same BS, their absolute C/I information transmissions occur at different times. Since transmission of absolute C/I information requires greater power than that of relative C/I information, concurrent transmission of absolute C/Is from the MSs causes an instantaneous increase in reverse interference. To prevent this problem, the absolute C/I transmissions from the MSs are distributed uniformly across a absolute C/I transmission period.

Figure 5:
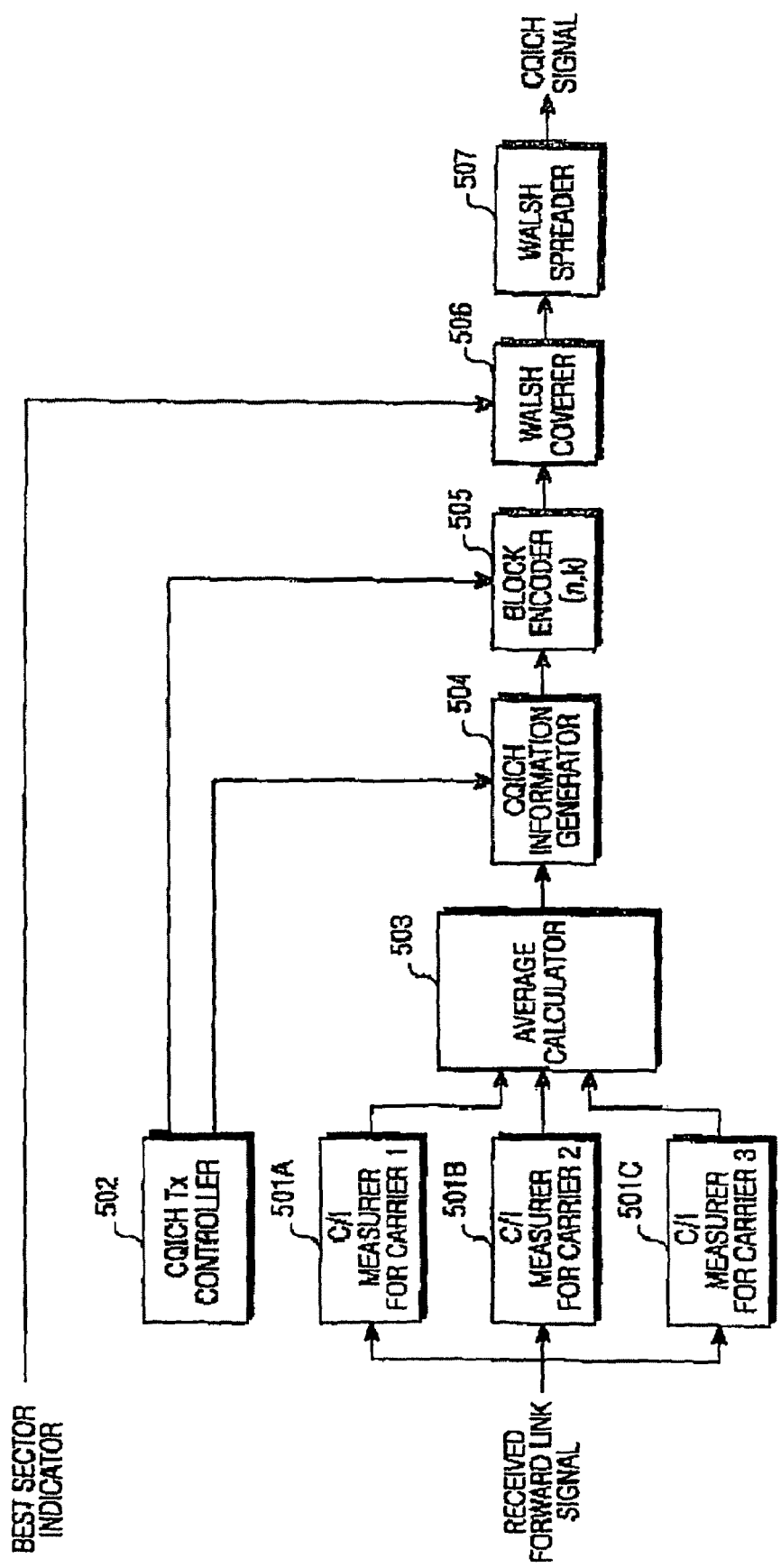
FIG. 5 is a block diagram of an R-CQICH transmitter according to the embodiment of the present invention.

FIG. 5 is a block diagram of an R-CQICH transmitter using three carriers according to the first embodiment of the present invention. Referring to FIG. 5, three C/I measurers 501A, 501B, and 501C measure the C/Is of forward pilot channel signals received by three carriers, respectively. An average calculator 503 calculates an average of the three C/I measurements and a CQICH information generator 504 generates 4-bit absolute C/I information or 1-bit relative C/I information under the control of a CQICH transmission controller (a CQICH Tx controller) 502. The CQICH Tx controller 502 determines whether to generate the absolute C/I or relative C/I information according to the transmission period and transmission time of the absolute C/I information selected between a BS and an MS.

A block encoder 505 encodes the C/I information at a coding rate of (n, k). The coding rate varies according to the number of bits of the C/I information. For the 4-bit absolute C/I information, the coding rate is (n, 4) and for the 1-bit relative C/I information, the coding rate is (n, 1). Thus, the block encoder 505 selectively uses the two coding rates under the control of the CQICH Tx controller 502.

A Walsh coverer 506 covers the n code symbols received from the block encoder 505 with a Walsh code of length 8 determined according to a 3-bit BSI. The BSI indicates a sector in the forward channel status in an active set listing BSs communicating with the MS.

A Walsh spreader 507 spreads the Walsh-covered sequence with a Walsh code assigned to the R-CQICH. The Walsh-spread signal is then transmitted to the active set BSs.

Figure 6:
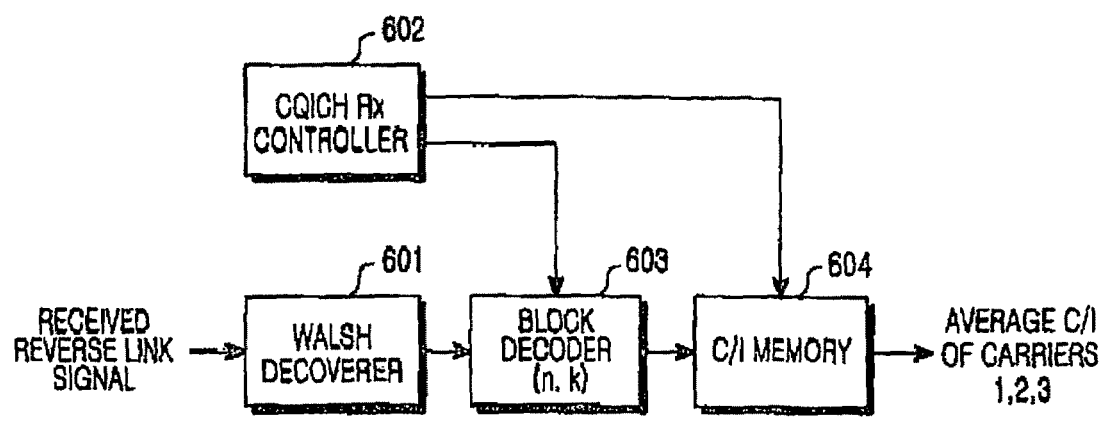
FIG. 6 is a block diagram of an R-CQICH receiver in correspondence with the R-CQICH transmitter illustrated in FIG. 5.

FIG. 6 is a block diagram of an R-CQICH receiver corresponding to the R-CQICH transmitter illustrated in FIG. 5. Referring to FIG. 6, a Walsh decoverer 601 decovers a channel-compensated R-CQICH signal with a Walsh code assigned to the BS. A block decoder 603 decodes the Walsh-decovered signal at a coding rate of (n, 1) or (n, 4), thereby recovering C/I information.

The coding rate is determined by a CQICH reception controller (CQICH Rx controller) 602. The CQICH Rx controller 602 selects (n, 4) for a slot transmitting absolute C/I information, and (n, 1) for a slot transmitting relative C/I information according to the transmission period and transmission time of the absolute C/I information selected with the R-CQICH transmitter. A C/I memory 604 stores the recovered C/I information. If the C/I information is 4-bit absolute C/I information, the C/I memory 604 discards the previous C/I information and is refreshed with the absolute C/I information. If the C/I information is 1-bit relative C/I information, the C/I memory 604 increases or decreases the previous C/I information by a predetermined level according to the relative C/I information. The increment or decrement is preset between the MS and the BS before communication is initiated.

Figure 7:
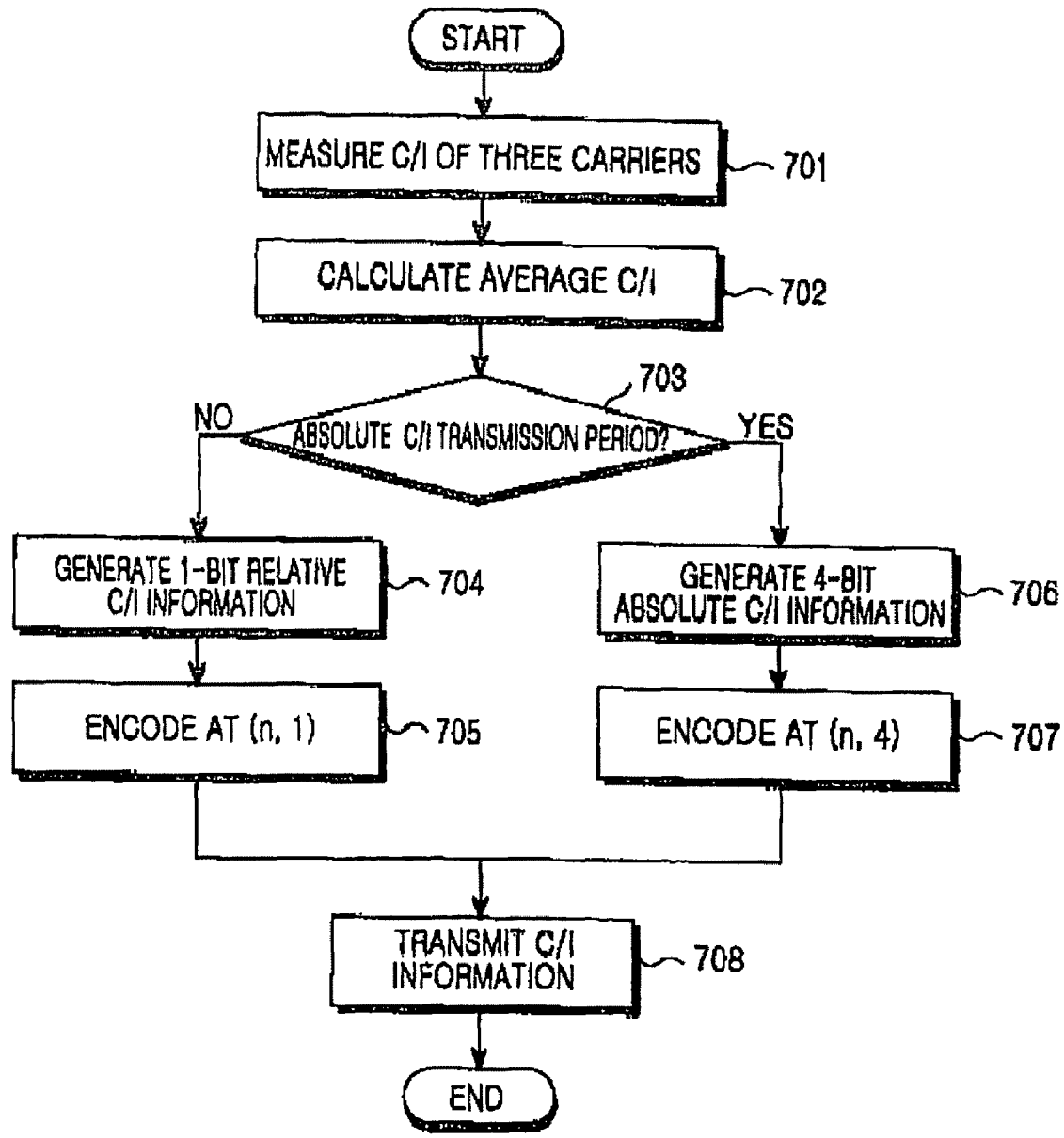
FIG. 7 is a flowchart illustrating an operation for transmitting information about a forward channel status in the R-CQICH transmitter illustrated in FIG. 5.

FIG. 7 is a flowchart illustrating an operation for transmitting forward channel status information in the R-CQICH transmitter illustrated in FIG. 5. Referring to FIG. 7, the C/I measurers 501A, 501B, and 501C measure forward pilot channel C/Is with respect to three carriers in step 701 and the average calculator 503 calculates the average of the C/I measurements in step 702. When averaging the C/I measurements, the MS must consider whether the power of the forward pilot channel is the same on each carrier, or different according to the carriers. In the former case, the MS sums the C/I measurements and simply divides the sum by the number of the carriers. However, in the latter case, the MS must compensate the C/I measurements for power differences.

In step 703, the CQICH Tx controller 502 determines whether to generate absolute C/I information or relative C/I information using the average C/I. One of methods of making the determination is to transmit a absolute C/I when the solution to the following formula is 0, and a relative C/I when the solution is a value other than 0.

$$(T-N-\text{Mobile\_Parameter}) \bmod \text{period} \tag{1}$$

where T is system time represented in the number of slots, period is a absolute C/I transmission period, N is a time point when a absolute C/I is transmitted in the transmission period, Mobile_Parameter is an MS-specific value for distributing absolute C/I transmissions from a plurality of MSs, and mod represents modulo operation.

If the relative C/I information is to be transmitted, the CQICH information generator 504 generates the relative C/I information using the average C/I in step 704. To generate the relative C/I information, the CQICH information generator 504 compares the average C/I of the previous slot with that of the current slot. If the average C/I of the current slot is greater than that of the previous slot, the 1-bit relative C/I information is set to indicate C/I increase. Otherwise, it is set to indicate C/I decrease. The block encoder 505 encodes the relative C/I information at a coding rate of (n, 1) in step 705 and the n code symbols are transmitted in step 708.

If the absolute C/I information is to be transmitted, the CQICH information generator 504 generates the absolute C/I information using the average C/I in step 706. To generate the absolute C/I information, the CQICH information generator 504 maps the average C/I to corresponding C/I information referring to Table 1. In Table 1, a4 is reserved and thus the other bits "a3, a2, a1, a0" are selected as 4-bit absolute C/I information. The block encoder 505 encodes the absolute C/I information at a coding rate of (n, 4) in step 707 and the n code symbols are transmitted in step 708.

Figure 8:
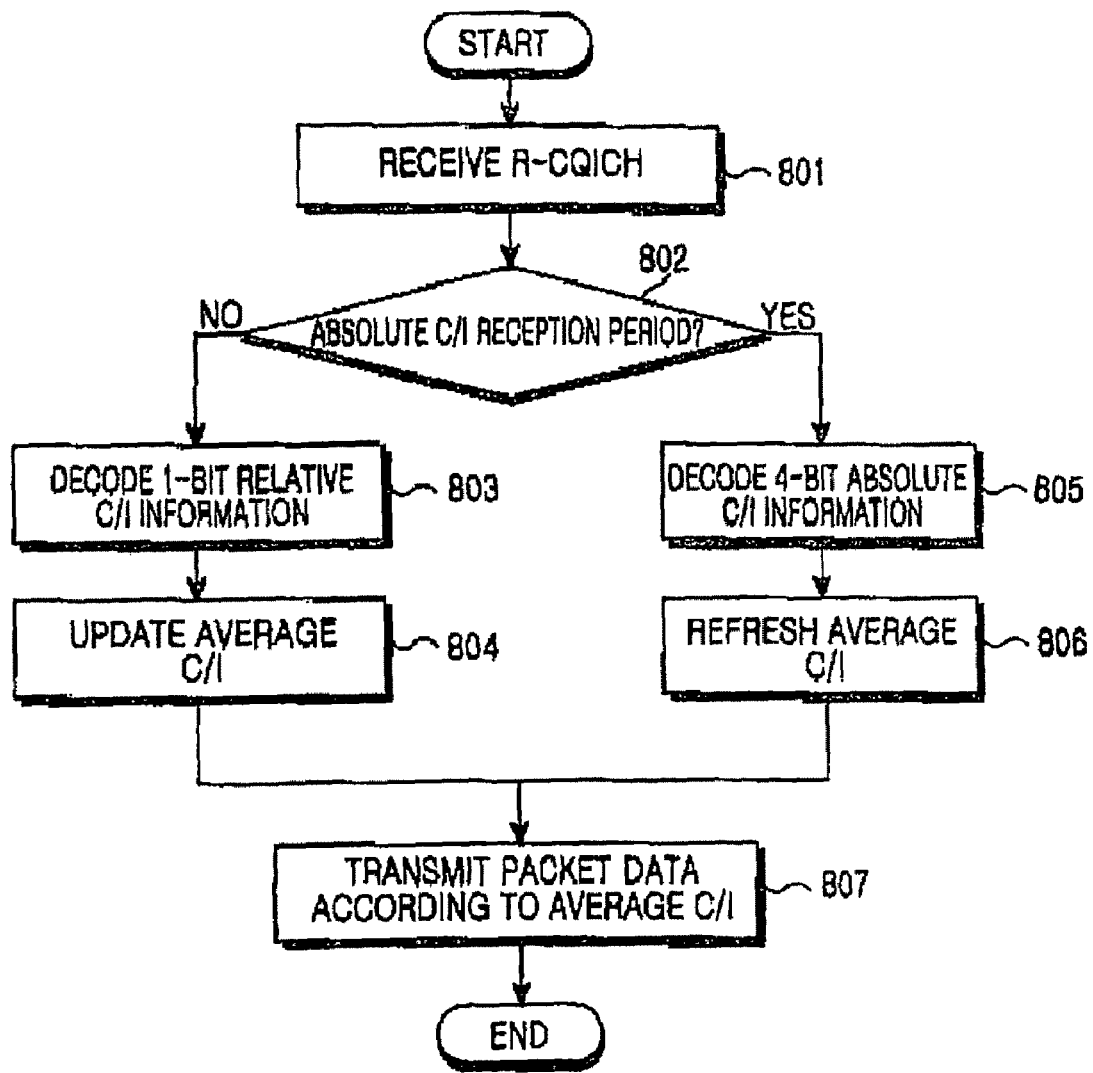
FIG. 8 is a flowchart illustrating an operation for receiving information about the forward channel status in the R-CQICH receiver illustrated in FIG. 6.

FIG. 8 is a flowchart illustrating an operation for receiving forward channel status information in the R-CQICH receiver illustrated in FIG. 6. Referring to FIG. 8, the R-CQICH receiver receives an R-CQICH signal from the R-CQICH transmitter illustrated in FIG. 5 in step 801. After despreading, channel compensation, and Walsh decovering, the CQICH Rx controller 602 determines whether the current slot of the R-CQICH contains relative C/I information or absolute C/I information in step 802. As stated before, when the solution to the above formula (Equation 1) is 0, the CQICH Rx controller 602 considers that absolute C/I information has been received. If the solution is a value other than 0, the CQICH Rx controller 602 considers that relative C/I information has been received.

In the case of relative C/I information, the block decoder 603 decodes the R-CQICH signal at a coding rate of (n, 1) in step 803 and the C/I memory 604 updates stored average C/I of three carriers according to the recovered 1-bit relative C/I information in step 804. In the case of absolute C/I information, the block decoder 603 decodes the R-CQICH signal at a coding rate of (n, 4) in step 805 and the C/I memory 604 is refreshed with the absolute C/I in step 806.

In step 807, the updated or refreshed forward average C/I is used for forward packet data scheduling and determination of transmission parameters such as a modulation scheme and a coding rate.

Second Embodiment

In a second embodiment of the present invention, an MS selects a carrier having the best forward channel status among a plurality of carriers and measures the C/I of a forward pilot channel with respect to the selected carrier.

Figure 9:
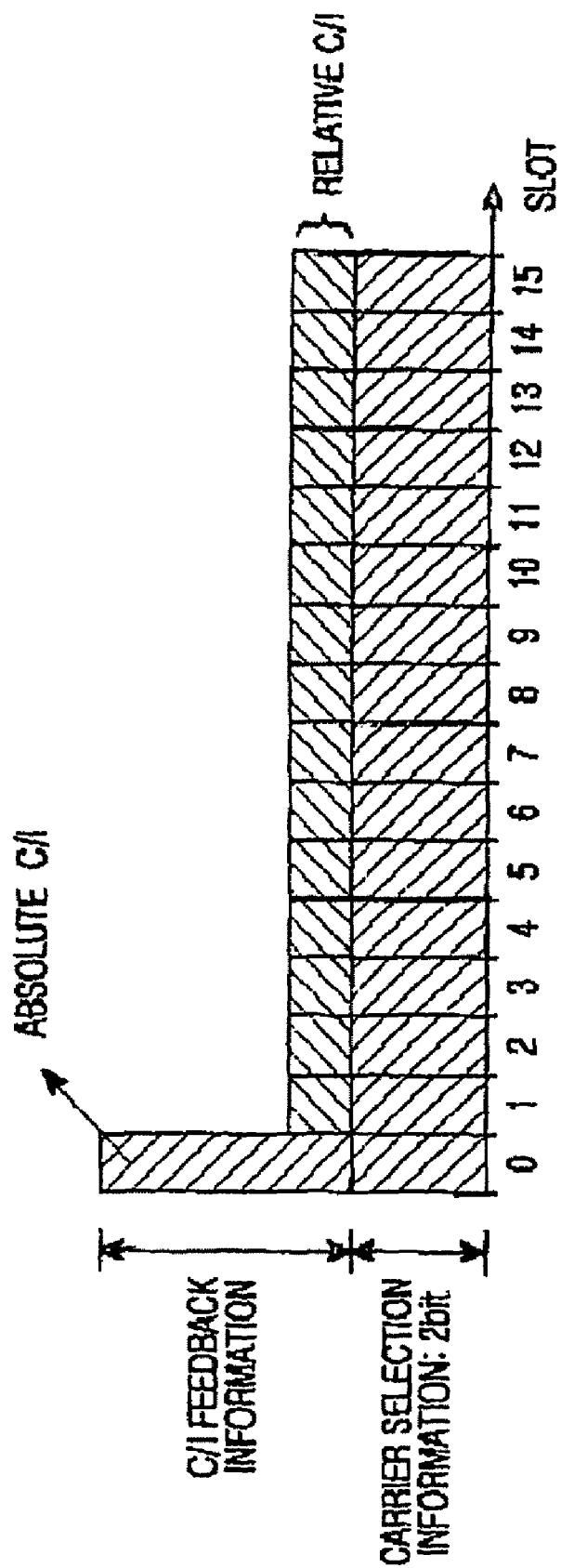
FIG. 9 illustrates an R-CQICH slot format for 3xEV-DV according to a second embodiment of the present invention.

FIG. 9 illustrates an R-CQICH slot format for 3xEV-DV according to the second embodiment of the present invention. The R-CQICH delivers carrier selection information indicating a carrier in the best forward channel status (hereinafter, referred to as the best carrier), and the C/I information of the forward pilot channel with respect to the best carrier.

The MS selects the best of three carriers received from the BS and transmits corresponding carrier selection information and C/I information to the BS. The BS then transmits packet data on the best carrier, thereby maximizing system capacity.

The carrier selection information is formed in 2 bits with which 3 carriers can be identified, and transmitted with the C/I information in each slot. The C/I information is 4-bit absolute C/I information or 1-bit relative C/I information. The transmission period and transmission time of the absolute C/I information are selected between the MS and the BS.

In FIG. 9, a single MS transmits forward channel status information every 16 slots. If two or more MSs transmit forward channel status information to the same BS, their absolute C/I information transmissions occur at different times. Since transmission of absolute C/I information requires greater power than that of relative C/I information, concurrent transmission of absolute C/Is from the MSs causes an instantaneous increase in reverse interference. To prevent this problem, the absolute C/I transmissions from the MSs are distributed uniformly across a absolute C/I transmission period.

Figure 10:
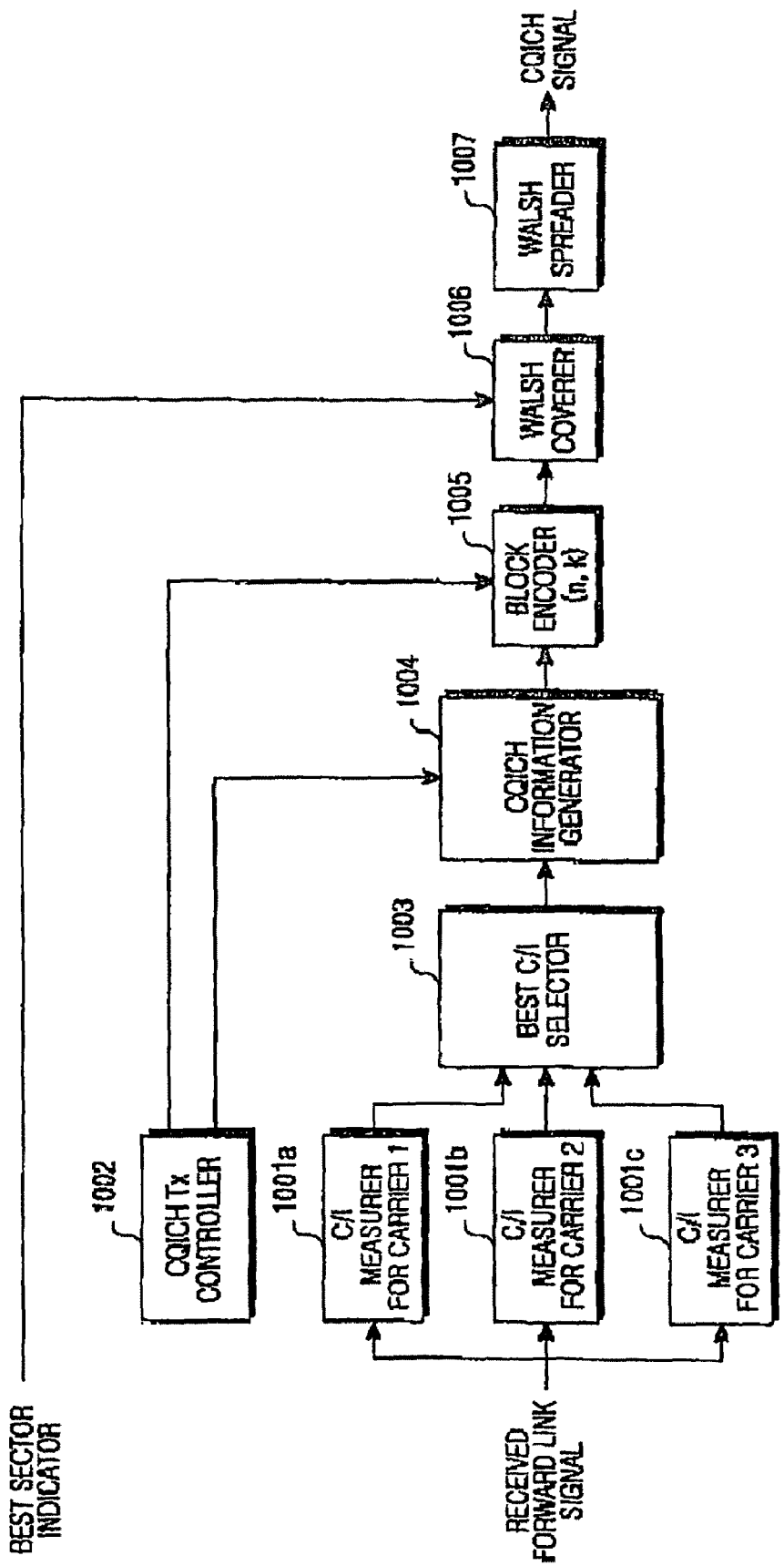
FIG. 10 is a block diagram of an R-CQICH transmitter according to the second embodiment of the present invention.

FIG. 10 is a block diagram of an R-CQICH transmitter using three carriers according to the second embodiment of the present invention. Referring to FIG. 10, three C/I measurers 1001a, 1001b and 1001c measure the C/Is of forward pilot channel signals received by three carriers, respectively. A best C/I selector 1003 selects a maximum of the C/I measurements and a CQICH information generator 1004 generates 2-bit carrier selection information and one of 4-bit absolute C/I information and 1-bit relative C/I information using the maximum C/I measurement under the control of a CQICH Tx controller 1002. The CQICH Tx controller 1002 determines whether to generate the absolute C/I or relative C/I information in each slot.

If the absolute C/I information is to be transmitted, the CQICH information generator 1004 outputs the 4-bit absolute C/I information and the 2-bit carrier selection information. If the relative C/I information is to be transmitted, the CQICH information generator 1004 outputs the 1-bit relative C/I information and the 2-bit carrier selection information. Mapping of C/I information and carrier selection information to bits output from the CQICH information generator 1004 is illustrated in Table 2 below.

TABLE 2

| C/I information for transmission | Bits |
|---|---|
| Absolute C/I information | Bits #0 and #1: carrier selection information<br>Bits #2 to #5: absolute C/I information |
| Relative C/I information | Bits #0 and #1: carrier selection information<br>Bit #2: relative C/I information |

A block encoder 1005 encodes the 6- or 3-bit CQICH information at a coding rate of (n, k). The coding rate varies according to the number of bits of the input CQICH information. For the 4-bit absolute C/I information and the 2-bit carrier selection information, the coding rate is (n, 6) and for the 1-bit relative C/I information and the 2-bit carrier selection information, the coding rate is (n, 3). Thus, the block encoder 1005 selectively uses the two coding rates under the control of the CQICH Tx controller 1002.

A Walsh coverer 1006 covers the n code symbols received from the block encoder 1005 with a Walsh code of length 8 determined according to a 3-bit BSI. The BSI indicates a sector in the forward channel status in an active set listing BSs communicating with the MS.

A Walsh spreader 1007 spreads the Walsh-covered sequence with a Walsh code assigned to the R-CQICH. The Walsh-spread signal is then transmitted to the active set BSs.

Figure 11:
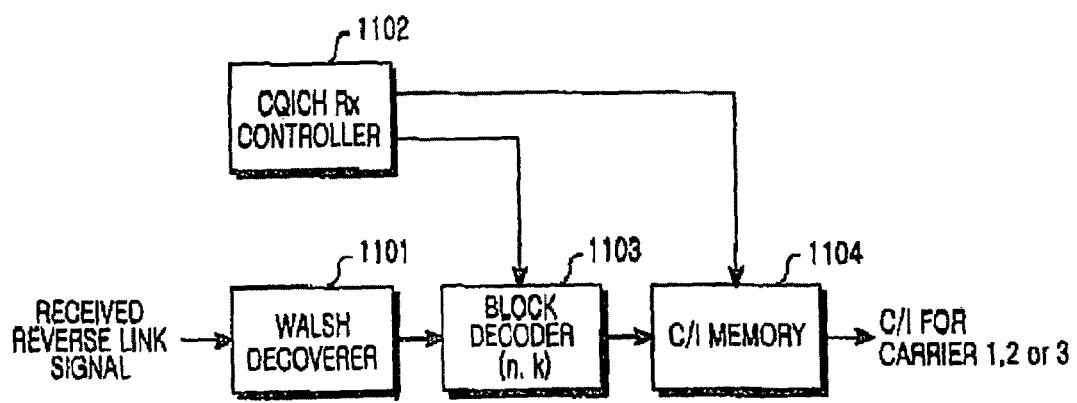
FIG. 11 is a block diagram of an R-CQICH receiver in correspondence with the R-CQICH transmitter illustrated in FIG. 10.

FIG. 11 is a block diagram of an R-CQICH receiver corresponding to the R-CQICH transmitter illustrated in FIG. 10. Referring to FIG. 11, a Walsh decoverer 1101 decovers a channel-compensated R-CQICH signal with a Walsh code assigned to the BS. A block decoder 1103 decodes the Walsh-decovered signal at a coding rate of (n, 6) or (n, 3), thereby recovering C/I information and carrier selection information.

The coding rate is determined by a CQICH Rx controller 1102. The CQICH Rx controller 1102 selects (n, 6) for a slot transmitting absolute C/I information and carrier selection information, and (n, 3) for a slot transmitting relative C/I information and carrier selection information according to the transmission period and transmission time of the absolute C/I information selected with the R-CQICH transmitter.

Mapping of bits output from the block decoder 1103 to C/I information and carrier selection information is illustrated in Table 3 below.

TABLE 3

| Received information | Decoded bits |
|---|---|
| Absolute C/I information | Bits #0 and #1: carrier selection information<br>Bits #2 to #5: absolute C/I information |
| Relative C/I information | Bits #0 and #1: carrier selection information<br>Bit #2: relative C/I information |

A C/I memory 1104 stores the recovered C/I information. If the C/I information is 4-bit absolute C/I information, the C/I memory 1104 discards the previous C/I information and is refreshed with the absolute C/I information. If the C/I information is 1-bit relative C/I information, the C/I memory 1104 increases or decreases the previous C/I information by a predetermined level according to the relative C/I information. The increment or decrement is preset between the MS and the BS.

The recovered carrier selection information indicates a carrier that the C/I information is about.

Figure 12:
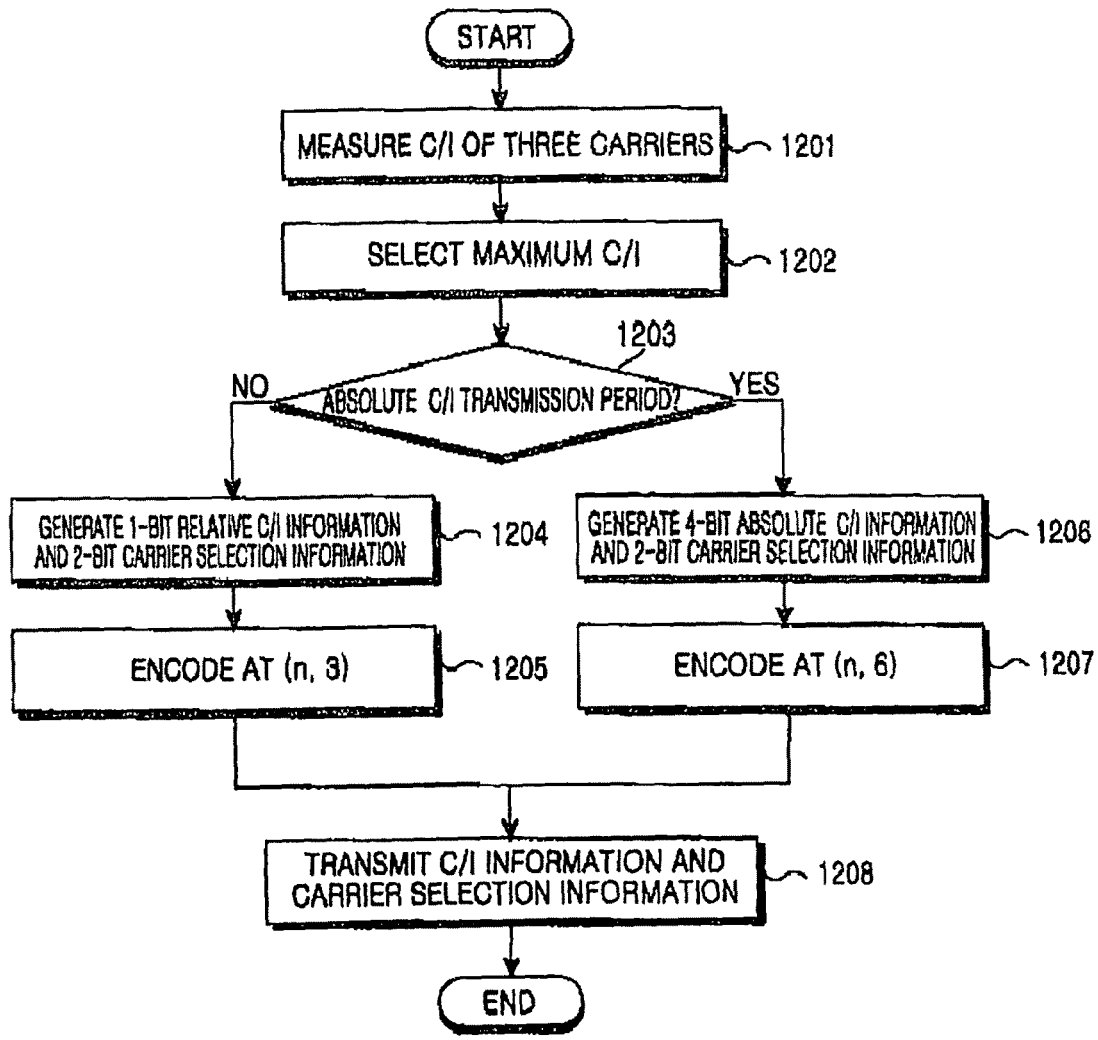
FIG. 12 is a flowchart illustrating an operation for transmitting information about a forward channel status in the R-CQICH transmitter illustrated in FIG. 10.

FIG. 12 is a flowchart illustrating an operation for transmitting forward channel status information in the R-CQICH transmitter illustrated in FIG. 10. Referring to FIG. 12, the C/I measurers 1001a, 1001b, and 1001c measure forward pilot channel C/Is with respect to three carriers in step 1201 and the best C/I selector 1003 selects a maximum of the C/I measurements in step 1202. When selecting the maximum C/I measurement, the MS must consider whether the power of the forward pilot channel is the same on each carrier, or different according to the carriers. In the former case, the MS simply selects the maximum C/I measurement. However, in the latter case, the MS must compensate the C/I measurements for power differences.

In step 1203, the CQICH Tx controller 1002 determines whether to generate absolute C/I information or relative C/I information using the maximum C/I. One of methods of making the determination is to transmit a absolute C/I when the solution of Eq. (1) is 0, and a relative C/I when the solution is a value other than 0.

If the relative C/I information is to be transmitted, the CQICH information generator 1004 generates the relative C/I information using the maximum C/I in step 1204. To generate the relative C/I information, the CQICH information generator 1004 compares the maximum C/I of the previous slot with that of the current slot. If the maximum C/I of the current slot is greater than that of the previous slot, the 1-bit relative C/I information is set to indicate C/I increase. Otherwise, it is set to indicate C/I decrease. The CQICH information generator 1004 also generates 2-bit carrier selection information corresponding to the ID of the best carrier to indicate the best carrier in step 1204. The block encoder 1005 encodes the 1-bit relative C/I information and the 2-bit carrier selection information at a coding rate of (n, 3) in step 1205 and the n code symbols are transmitted to the BS in step 1208.

If the absolute C/I information is to be transmitted in step 1203, the CQICH information generator 1004 generates the absolute C/I information using the maximum C/I in step 1206. To generate the absolute C/I information, the CQICH information generator 1004 maps the maximum C/I to corresponding C/I information referring to Table 1. In Table 1, a4 is reserved and thus the other bits "a3, a2, a1, a0" are selected as 4-bit absolute C/I information. The CQICH information generator 1004 also generates the 2-bit carrier selection information corresponding to the ID of the best carrier to indicate the best carrier in step 1206. The block encoder 1005 encodes the 4-bit absolute C/I information and the 2-bit carrier selection information at a coding rate of (n, 6) in step 1207 and the n code symbols are transmitted to the BS in step 1208.

Figure 13:
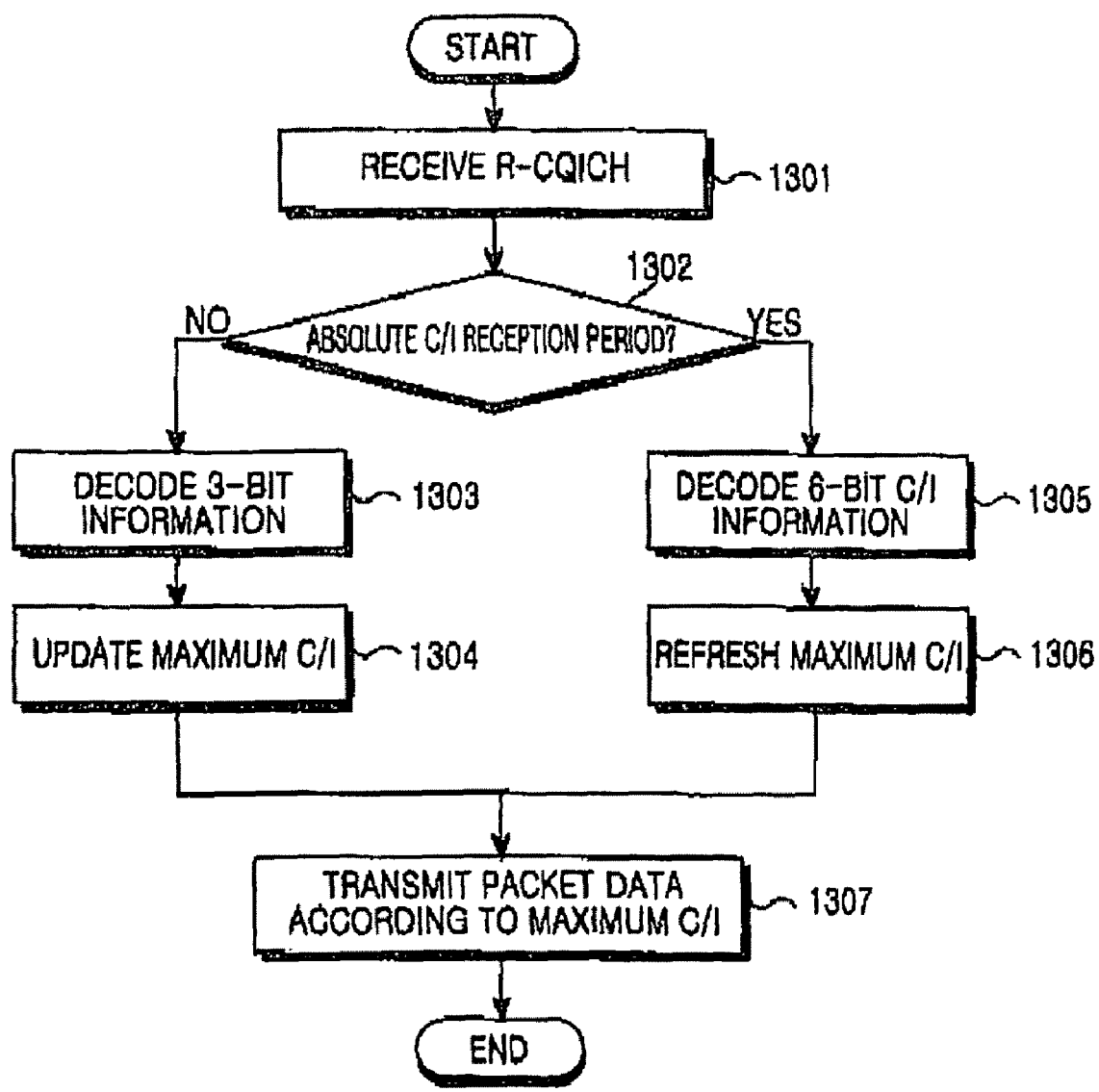
FIG. 13 is a flowchart illustrating an operation for receiving information about the forward channel status in the R-CQICH receiver illustrated in FIG. 11.

FIG. 13 is a flowchart illustrating an operation for receiving forward channel status information in the R-CQICH receiver illustrated in FIG. 11. Referring to FIG. 13, the R-CQICH receiver receives an R-CQICH signal from the R-CQICH transmitter illustrated in FIG. 10 in step 1301. After despreading, channel compensation, and Walsh decovering, the CQICH Rx controller 1102 determines whether the current slot of the R-CQICH contains relative C/I information or absolute C/I information in step 1302. As stated before, when the solution to Eq. (1) is 0, the CQICH Rx controller 1102 determines that absolute C/I information has been received. If the solution is a value other than 0, the CQICH Rx controller 1102 determines that relative C/I information has been received.

In the case of relative C/I information, the block decoder 1103 decodes the R-CQICH signal at a coding rate of (n, 3), thereby recovering 1-bit relative C/I information and 2-bit carrier selection information in step 1303. In step 1304, the C/I memory 1104 updates stored maximum of the C/I measurements of three carriers in the previous slot according to the recovered 1-bit relative C/I information in the current slot. Even if carrier selection information received in the previous and current slots indicates different carriers, the maximum C/I measurement stored in the C/I memory 1104 is updated.

In the case of absolute C/I information, the block decoder 1103 decodes the R-CQICH signal at a coding rate of (n, 6), recovering 4-bit absolute C/I information and 2-bit carrier selection information in step 1305. The C/I memory 114 is refreshed with the absolute C/I in step 1306. Even if carrier selection information received in the previous and current slots indicates differential carriers, the C/I memory 1104 is refreshed.

In accordance with the second embodiment of the present invention, the C/I memory 1104 stores only the C/I measurement of one carrier irrespective of the number of carriers.

In step 1307, the updated or refreshed forward maximum C/I is used for forward packet data scheduling and determination of transmission parameters such as a modulation scheme and a coding rate.

Third Embodiment

In a third embodiment of the present invention, an MS generates forward channel status information of a plurality of carriers using the C/I measurement of a forward channel signal on each of the carriers.

With the average C/I measurement of the carriers in accordance with the first embodiment of the present invention, a BS cannot optimize transmission parameters for each of the carriers in different forward channel statuses. If the MS transmits the C/I information of one carrier in the best forward channel status in the second embodiment of the present invention, the BS cannot determine the forward channel statuses of the other carriers except the best carrier.

Therefore, the MS transmits the C/I information of each carrier in the third embodiment of the present invention. The BS then can determine how many carriers to be used and what transmission parameters (modulation scheme and coding rate, etc.) to be used for each carrier for transmission of packet data to the MS.

Figure 14:
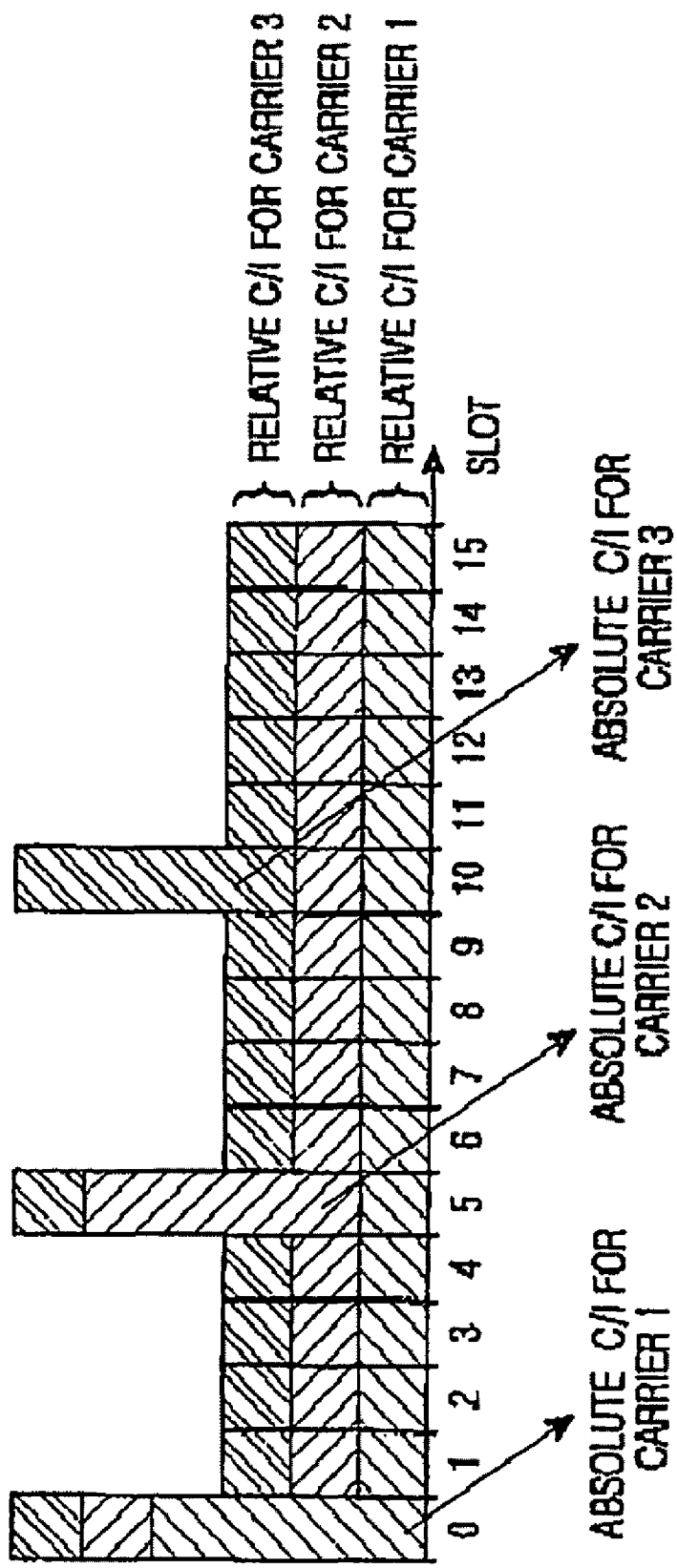
FIG. 14 illustrates an R-CQICH slot format for 3xEV-DV according to a third embodiment of the present invention.

FIG. 14 illustrates an R-CQICH slot format for 3xEV-DV according to the third embodiment of the present invention. The R-CQICH delivers the absolute C/I and relative C/I information of the carriers. The absolute C/I information is transmitted in an order predetermined between the MS and the BS, with power greater than the relative C/I information, for example, twice as much power.

The absolute C/I information of the carriers is transmitted in different slots. Otherwise, the MS must use a large amount of transmission power. The resulting increase in its peak-to-average power ratio may cause a malfunction of a power amplifier in the MS. To prevent this problem, the absolute C/I information is arranged in different slots, #0, #5, and #10.

The distributed absolute C/I transmission is possible by maintaining a predetermined interval between the absolute C/I transmission periods. For example, if the transmission period of the absolute C/I information is 16 slots and three carriers are used, 5 slots is a desirable absolute C/I transmission interval. If the transmission interval is 1 slot, the MS successively transmits the absolute C/I measurements of the carriers.

Let the number of carriers transmitted from the BS be Num_Carrier, the transmission period of the absolute C/I of each carrier be tx_period, and the transmission interval between the absolute C/I measurements be tx_interval. Then, $$\text{tx\_interval} \leq \frac{\text{tx\_period} - 1}{\text{Num\_Carrier} - 1} \quad (2)$$

where tx_interval represents the transmission interval between the absolute C/I measurements of carrier 1 and carrier 2 and between the absolute C/I measurements of carrier 2 and carrier 3. tx_period, tx_interval, and Num_Carrier are positive integers, and tx_period and tx_interval are represented in the number of slots.

If Num_Carrier is 3 and tx_period is 16, tx_interval is between 1 and 7. If tx_interval is 7, the MS transmits the absolute C/Is of carriers 1, 2, and 3 in Nth, (N+7)th, and (N+14)th slots, respectively. In an (N+16)th slot, the MS transmits the absolute C/I of carrier 1.

In FIG. 14, a single MS transmits forward channel status information in 16 slots. If two or more MSs transmit forward channel status information to the same BS, their absolute C/I information transmissions occur at different times. Since transmission of absolute C/I information requires greater power than that of relative C/I information, concurrent transmission of absolute C/Is from the MSs causes an instantaneous increase in reverse interference. To prevent this problem, the absolute C/I transmissions from the MSs are distributed uniformly across a absolute C/I transmission period.

Consequently, the MS must transmit the absolute C/I information of the carriers in a different time period from that from other MSs. It also must transmit the absolute C/I information of the carriers in different time periods.

Figure 15:
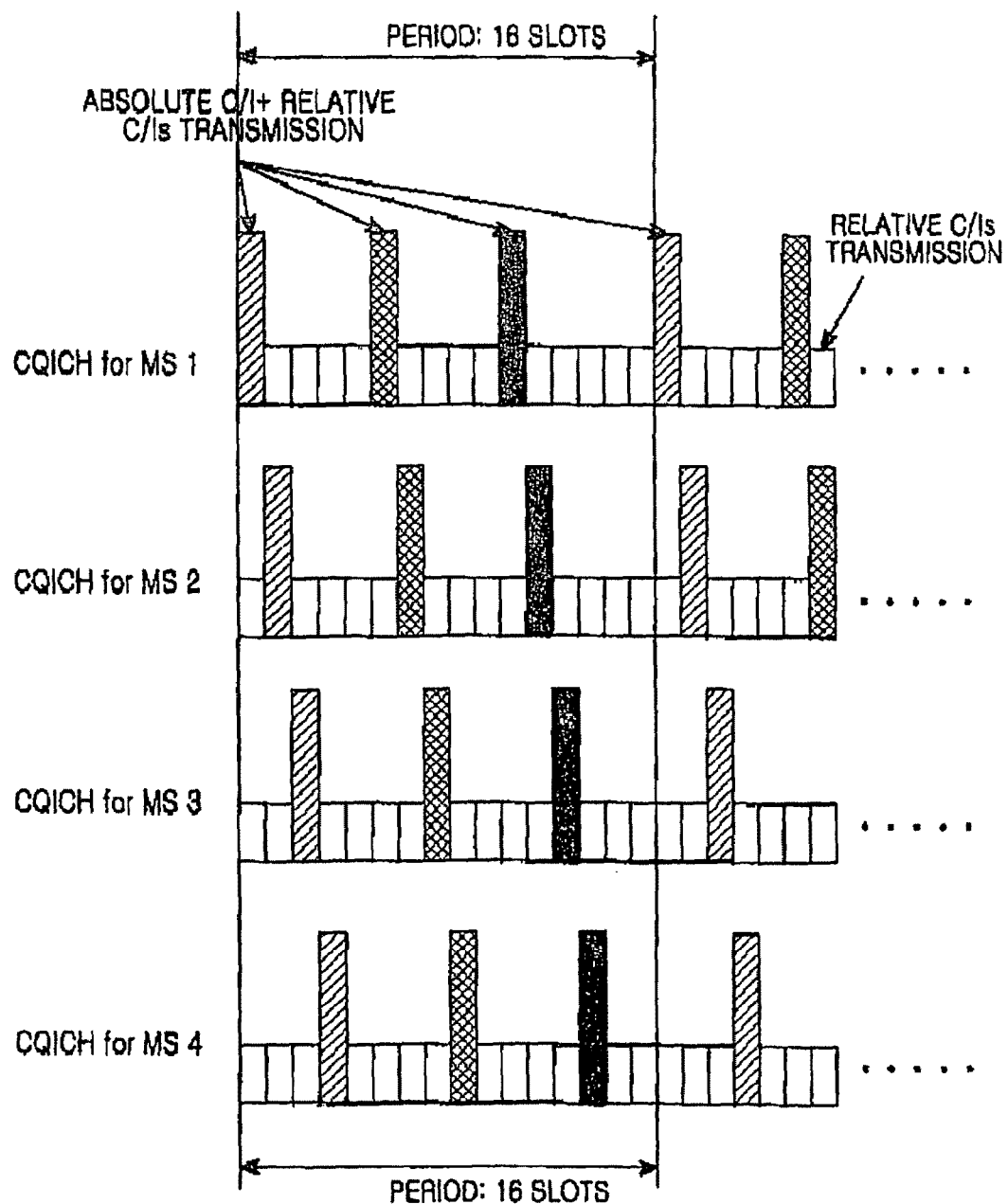
FIG. 15 illustrates concurrent transmission of R-CQICHs from a plurality of MSs according to the third embodiment of the present invention.

FIG. 15 illustrates R-CQICH slot formats when a plurality of MSs transmit forward channel status information simultaneously. Here, the transmission interval tx_interval between the absolute C/I measurements of three carriers is 5 slots and the transmission period tx_period of the absolute C/I of a particular carrier is 16 slots.

Referring to FIG. 15, each MS transmits absolute C/I measurements in different time periods from the other MSs. The absolute C/I measurements are arranged at intervals of 5 slots across the transmission period of 16 slots.

To determine a way a plurality of MSs transmit forward channel status information simultaneously, two transmission parameters are required. One parameter is the transmission interval tx_interval between the absolute C/I measurements of multi-carrier in each MS. The transmission interval tx_interval is achieved by Eq. (2). The other parameter is a time point N within the absolute C/I transmission period, when the absolute C/I of a particular carrier is transmitted. One of methods of determining N is to transmit the absolute C/I when the solution to the following formula is 0.

$$(T-N-\text{Mobile\_Parameter}-(\text{carrier\_id}-1)\times\text{tx\_period}) \\ \mod \text{tx\_period} \quad (3)$$

where T is system time represented in the number of slots, tx_period is the absolute C/I transmission period of the same carrier, N is a time point when a absolute C/I measurement is transmitted in a corresponding absolute C/I transmission period, and carrier_id is an identifier being a natural number starting from 1 to identify a carrier. tx_interval is the transmission interval between the absolute C/I measurements of the carriers, as determined by Eq. (2). If the solution to Eq. (3) is 0, the MS transmits the absolute C/I of a carrier corresponding to carrier_id.

While Eq. (2) is used to avoid overlap in transmission time between the absolute C/I measurements of carriers in an MS, Eq. (3) is used to avoid overlap in absolute C/I transmissions from a plurality of MSs.

Figure 16:
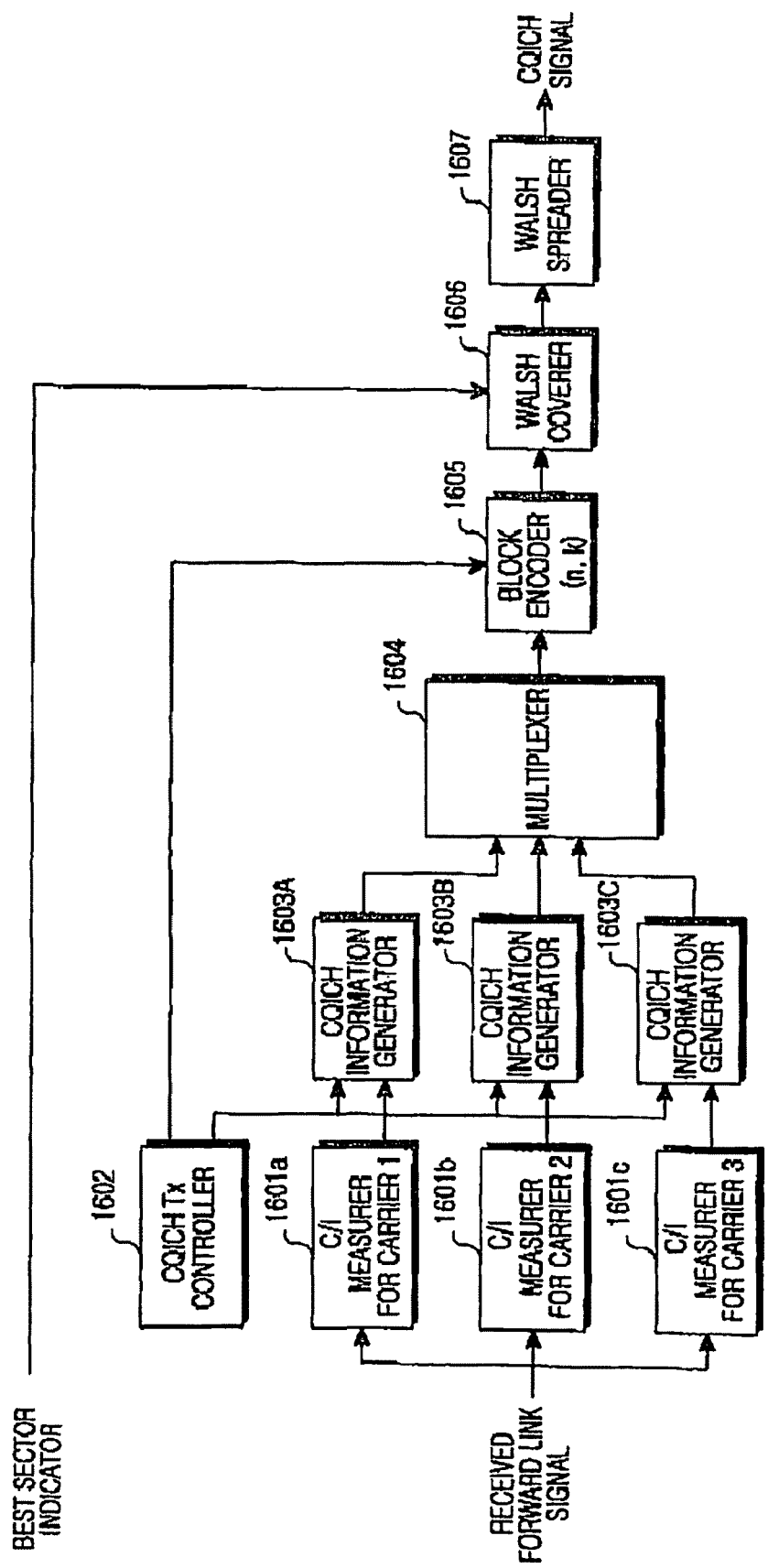
FIG. 16 is a block diagram of an R-CQICH transmitter according to the third embodiment of the present invention.

FIG. 16 is a block diagram of an R-CQICH transmitter using three carriers according to the third embodiment of the present invention. Referring to FIG. 16, three C/I measurers 1601a, 160b, and 1601c measure the C/Is of forward pilot channel signals received by three carriers, respectively and provide the C/I measurements to corresponding CQICH information generators 1603A, 1603B, and 1603C. The CQICH information generators 1603A, 1603B, and 1603C generate absolute C/I information or relative C/I information using the received C/I measurements under the control of a CQICH Tx controller 1602. The CQICH Tx controller 1602 determines whether to generate the absolute C/I or relative C/I information in the CQICH information generators 1603A, 1603B, and 1603C. A multiplexer (MUX) 1604 multiplexes in time division the C/I information received from the CQICH information generators 1603A, 1603B, and 1603C.

If absolute C/I information is to be transmitted, a corresponding CQICH information generator outputs 4-bit absolute C/I information. If relative C/I information is to be transmitted, the CQICH information generator outputs 1-bit relative C/I information.

Since absolute C/I transmissions for the three carriers are distributed, the total bit number of outputs of the CQICH information generators 1603A, 1603B, and 1603C is 6 when one of them outputs absolute C/I information, and 3 when all of them output relative C/I information. Mapping of C/I information to the output of the MUX 1604 is illustrated in Table 4 below.

TABLE 4

| C/I information for transmission | Bits |
| --- | --- |
| Absolute C/I information for carrier 1 | Bits #0 to #3: absolute C/I information for carrier 1 |
| | Bit #4: relative C/I information for carrier 2 |
| | Bit #5: relative C/I information for carrier 3 |
| Absolute C/I information for carrier 2 | Bit #0: relative C/I information for carrier 1 |
| | Bits #1 to #4: absolute C/I information for carrier 2 |
| | Bit #5: relative C/I information for carrier 3 |
| Absolute C/I information for carrier 3 | Bit #0: relative C/I information for carrier 1 |
| | Bit #1: relative C/I information for carrier 2 |
| | Bits #2 to #5: absolute C/I information for |

TABLE 4-continued

| C/I information for transmission | Bits |
|---|---|
| | carrier 3 |
| Relative C/I information for carriers 1, 2, and 3 | Bit #0: relative C/I information for carrier 1<br>Bit #1: relative C/I information for carrier 2<br>Bit #2: relative C/I information for carrier 3 |

A block encoder 1605 encodes the 6- or 3-bit multiplexed CQICH information at a coding rate of (n, k). The coding rate varies according to the number of bits of the input CQICH information. For the 4-bit absolute C/I information and the 2-bit relative C/I information, the coding rate is (n, 6) and for the 3-bit relative C/I information, the coding rate is (n, 3). The CQICH Tx controller 1602 determines whether to transmit absolute C/I information or relative C/I information for each carrier by Eq. (2) and Eq. (3) and determines the coding rate correspondingly.

A Walsh coverer 1606 covers the n code symbols received from the block encoder 1605 with a Walsh code of length 8 determined according to a 3-bit BSI. A Walsh spreader 1607 spreads the Walsh-covered sequence with a Walsh code assigned to the R-CQICH. The Walsh-spread signal is then transmitted to the active set BSs.

Figure 17:
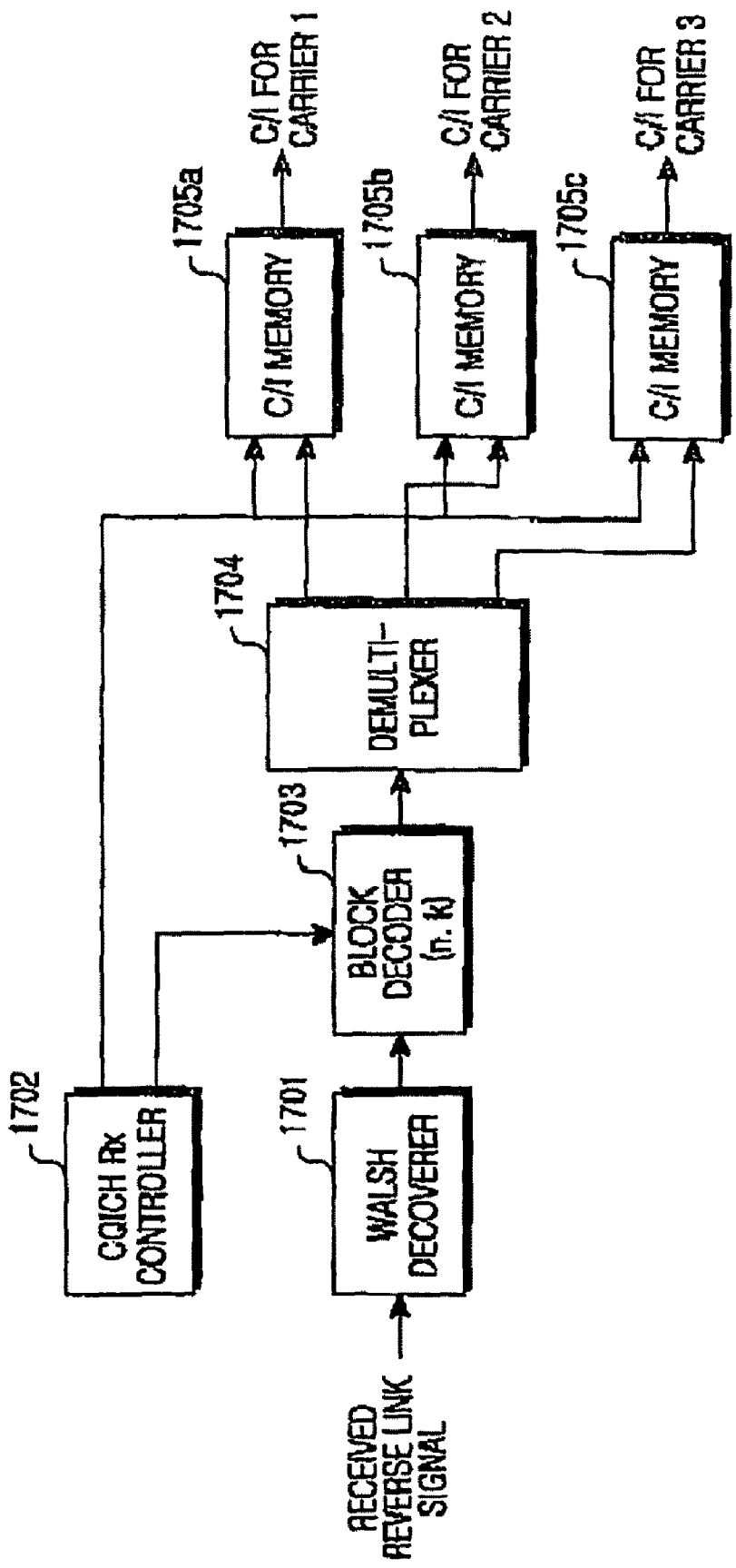
FIG. 17 is a block diagram of an R-CQICH receiver in correspondence with the R-CQICH transmitter illustrated in FIG. 16.

FIG. 17 is a block diagram of an R-CQICH receiver corresponding to the R-CQICH transmitter illustrated in FIG. 16. Referring to FIG. 17, a Walsh decoverer 1701 decovers a channel-compensated R-CQICH signal with a Walsh code assigned to the BS. A block decoder 1703 decodes the Walsh-decovered signal at a coding rate of (n, 6) or (n, 3), thereby recovering C/I information. The coding rate is determined by a CQICH Rx controller 1702. The CQICH Rx controller 1702 selects (n, 6) for a slot transmitting 4-bit absolute C/I information and 2-bit relative C/I information, and (n, 3) for a slot transmitting 3-bit relative C/I information according to Eq. (2) and Eq. (3). Mapping of decoded bits to C/I information is illustrated in Table 5 below.

TABLE 5

| Received C/I information | Decoded bits |
|---|---|
| Absolute C/I information for carrier 1 | Bits #0 to #3: absolute C/I information for carrier 1<br>Bit #4: relative C/I information for carrier 2<br>Bit #5: relative C/I information for carrier 3 |
| Absolute C/I information for carrier 2 | Bit #0: relative C/I information for carrier 1<br>Bits #1 to #4: absolute C/I information for carrier 2<br>Bit #5: relative C/I information for carrier 3 |
| Absolute C/I information for carrier 3 | Bit #0: relative C/I information for carrier 1<br>Bit #1: relative C/I information for carrier 2<br>Bit #2 to #5: absolute C/I information for carrier 3 |
| relative C/I information for carriers 1, 2, and 3 | Bit #0: relative C/I information for carrier 1<br>Bit #1: relative C/I information for carrier 2<br>Bit #2: relative C/I information for carrier 3 |

A demultiplexer (DEMUX) 1704 demultiplexes the decoded bits and provides CQICH information for carriers 1, 2, and 3 to C/I memories 1705*a*, 1705*b*, and 1705*c*, respectively. The C/I memories 1705*a*, 1705*b* and 1705*c* store the demultiplexed C/I information of the carriers respectively.

If received CQICH information is 4-bit absolute C/I information, a corresponding C/I memory discards the previous C/I information stored therein and is refreshed with the absolute C/I information. If the CQICH information is relative C/I information, the C/I memory increases or decreases the previous C/I measurement by a predetermined level according to the relative C/I information. The increment or decrement is preset between the MS and the BS.

Figure 18:
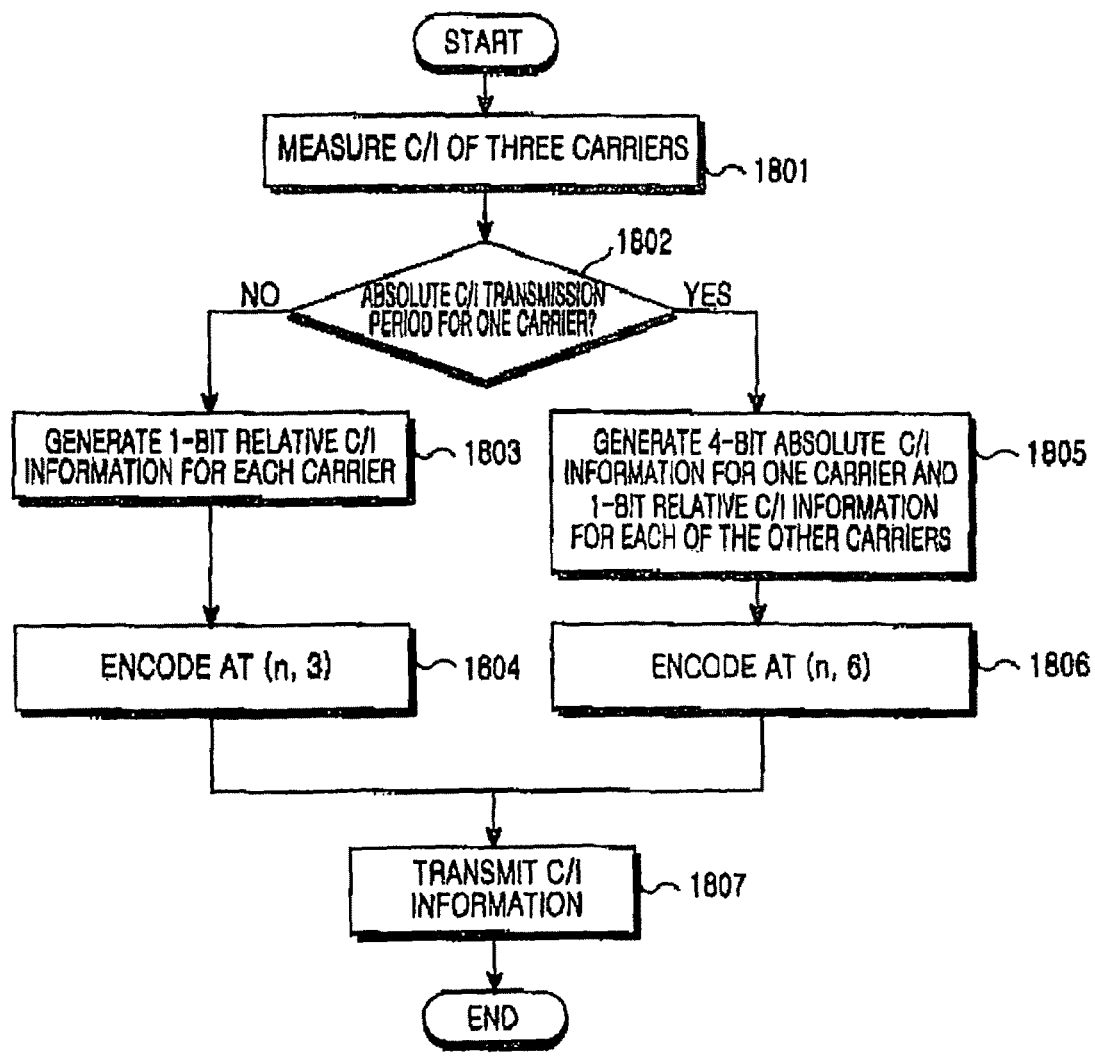
FIG. 18 is a flowchart illustrating an operation for transmitting information about a forward channel status in the R-CQICH transmitter illustrated in FIG. 16.

FIG. 18 is a flowchart illustrating an operation for transmitting forward channel status information in the R-CQICH transmitter illustrated in FIG. 16. Referring to FIG. 18, the C/I measurers 1601*a*, 1601*b*, and 1601*c* measure forward pilot channel C/Is with respect to three carriers in step 1801. The CQICH Tx controller 1602 determines whether to transmit absolute C/I information or relative C/I information for each carrier by Eq. (2) and Eq. (3) in step 1802. Eq. (2) determines the transmission interval between absolute C/I measurements for the carriers and when the solution to Eq. (3) is 0, absolute C/I information for a corresponding carrier and relative C/I information for the other carriers are transmitted.

If relative C/I information is to be transmitted for the three carriers, the CQICH information generators 1603A, 1603B, and 1603C generate the relative C/I information using their received C/I measurements in step 1803. To generate the relative C/I information, each of the CQICH information generators 1603A, 1603B, and 1603C compares the C/I measurement of the previous slot with that of the current slot for a corresponding carrier. If the C/I measurement of the current slot is greater than that of the previous slot, the 1-bit relative C/I information is set to indicate C/I increase. Otherwise, it is set to indicate C/I decrease. Consequently, 3-bit differential information is output from the CQICH information generators 1603A, 1603B, and 1603C. The block encoder 1605 encodes the 3-bit relative C/I information at a coding rate of (n, 3) in step 1804 and the n code symbols are transmitted to the BS in step 1807.

If absolute C/I information is to be transmitted for one of the three carriers and differential information is to be transmitted for the other carriers, a CQICH information generator for the carrier of the absolute C/I information, for example, the CQICH information generator 1603A generates 4-bit absolute C/I information by selecting 4-bit C/I information mapped to its received C/I measurement referring to Table 1. In Table 1, a4 is reserved and thus the other bits "a3, a2, a1, a0" are selected as 4-bit absolute C/I information in step 1805. The CQICH information generators 1603B and 1603C each generate 2-bit C/I information for the other carriers in step 1805.

The block encoder 1605 encodes the 6-bit C/I information at a coding rate of (n, 6) in step 1806 and the n code symbols are transmitted to the BS in step 1807.

In accordance with the third embodiment of the present invention, the sequence of transmitting C/I information on the R-CQICH is determined according to the mapping relation illustrated in Table 4. For example, if absolute C/I information is transmitted for carrier 1 and relative C/I information is transmitted for carriers 2 and 3, the MS arranges the absolute C/I for carrier 1 in bits #0 to #3, the relative C/I for carrier 2 in bit #4, and the relative C/I for carrier 3 in bit #5.

Figure 19:
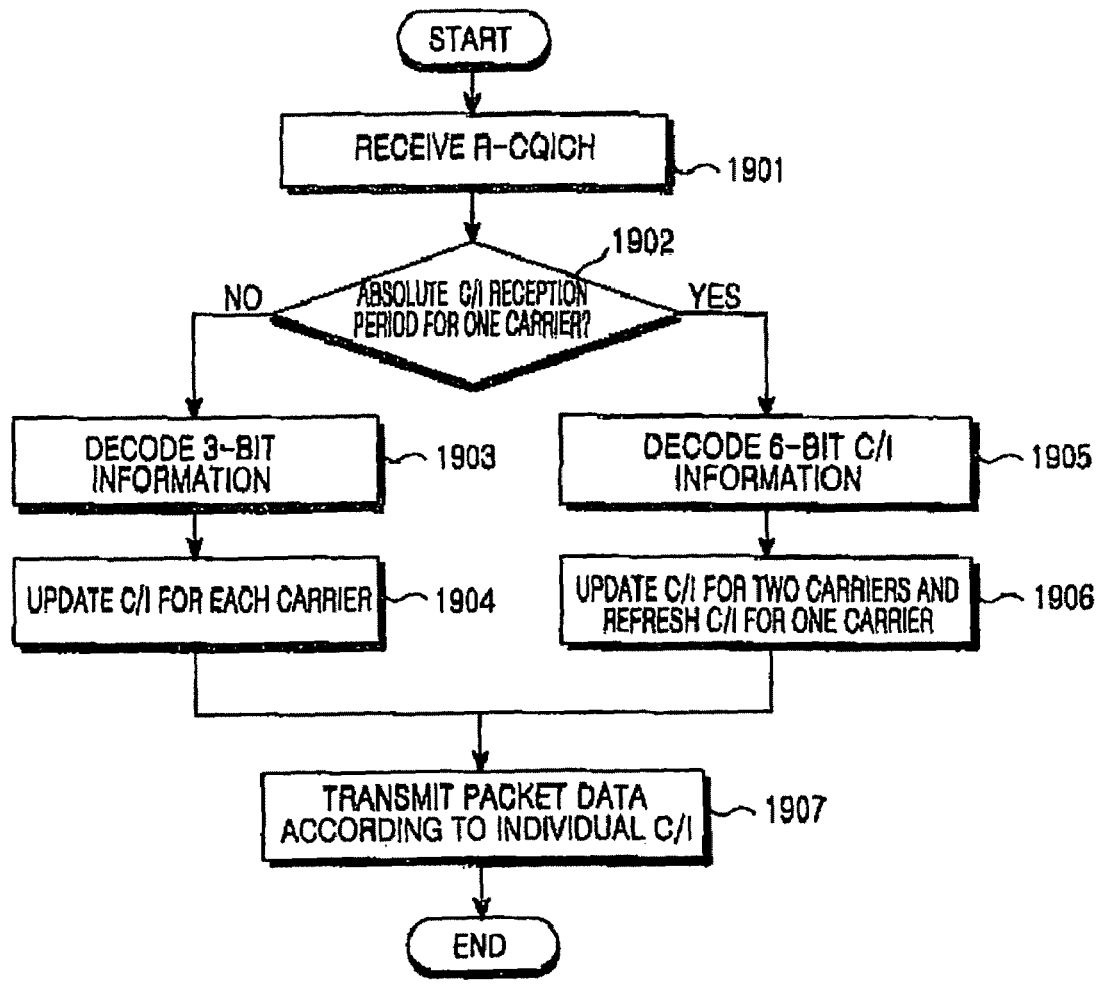
FIG. 19 is a flowchart illustrating an operation for receiving information about the forward channel status in the R-CQICH receiver illustrated in FIG. 17.

FIG. 19 is a flowchart illustrating an operation for receiving forward channel status information in the R-CQICH receiver illustrated in FIG. 17. Referring to FIG. 19, the R-CQICH receiver receives an R-CQICH signal from the R-CQICH transmitter illustrated in FIG. 16 in step 1901. After despreading, channel compensation, and Walsh decovering, the CQICH Rx controller 1702 determines whether the current slot of the R-CQICH contains absolute C/I and relative C/I information or only relative C/I information in step 1902. As stated above, when the solution to Eq. (3) is 0, the CQICH Rx controller 1702 determines that absolute C/I information for a particular carrier and relative C/I information for the other carriers have been received. If the solution is a value other than 0, the CQICH Rx controller 1702 determines that relative C/I information has been received for all the three carriers.

In the case of relative C/I information for the three carriers, the block decoder 1703 decodes the R-CQICH signal at a coding rate of (n, 3), thereby recovering 3-bit relative C/I information in step 1903.

In step 1904, the C/I memory 1705*a* updates the C/I measurement of the previous slot for carrier 1 stored therein according to the recovered 1-bit relative C/I information for carrier 1 in the current slot, the C/I memory 1705*b* updates the C/I measurement of the previous slot for carrier 2 stored therein according to the recovered 1-bit relative C/I information for carrier 2 in the current slot, and the C/I memory 1705*c* updates the C/I measurement of the previous slot for carrier 3 stored therein according to the recovered 1-bit relative C/I information for carrier 3 in the current slot.

In the case of absolute C/I information for one of the three carriers and relative C/I information for the other carriers, the block decoder 1703 decodes the R-CQICH signal at a coding rate of (n, 6), recovering 4-bit absolute C/I information and 2-bit relative C/I information in step 1905. In step 1906, a C/I memory for the carrier corresponding to the absolute C/I information, for example, the C/I memory 1705*a* is refreshed with the absolute C/I, and the C/I memories 1705*b* and 1705*c* update the C/I measurements of the previous slot stored therein according to the relative C/I information in the current slot.

The recovered C/I information is mapped to corresponding C/I information for the carriers according to Table 5. For example, if absolute C/I information for carrier 2 and relative C/I information for carriers 1 and 3 are received, the BS concludes that bit #0 indicates the relative C/I information for carrier 1, bits #1 to #4 indicate the absolute C/I information for carrier 2, and bit #5 indicates the relative C/I information for carrier 3.

In step 1907, the updated or refreshed C/I information for the three carriers is used for forward packet data scheduling and determination of transmission parameters such as a modulation scheme and a coding rate.

In accordance with the present invention as described above, an MS measures the forward channel status of each of carriers and reports the forward channel statuses to a BS in a multi-carrier mobile communication system. Thus, the BS transmits forward packet data according to the forward channel status information. The MS transmits absolute C/I information for each carrier in a predetermined slot and relative C/I information for the other carriers in the other slots. Consequently, reverse transmission capacity is significantly increased.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of transmitting forward channel status information to a base station (BS) from a mobile station (MS) in a multi-carrier mobile communication system, comprising the steps of:
    measuring strengths of forward channel signals received from the BS by a multi-carrier;
    calculating an average of the strength measurements by compensating the strength measurements for differences among transmission powers of the multi-carrier, and calculating an average of the compensated strength measurements;
    generating forward channel status information representing the calculated average strength measurements; and
    transmitting the forward channel status information to the BS.

2. The method of claim 1, wherein the steps of generating and transmitting the forward channel status information comprise:
    generating absolute information representing the calculated average strength measurements and transmitting the absolute information in a selected transmission period.

3. The method of claim 2, wherein the steps of generating and transmitting the forward channel status information further comprise:
    generating a relative information representing a difference from a previously calculated average strength measurements and transmitting the relative information in a remaining transmission period other than the selected transmission period.

4. The method of claim 2, wherein the absolute information is transmitted if a solution to (T−N−Mobile_Parameter)mod period is 0;

wherein T is system time represented in a number of slots, period is an absolute information transmission period, N is a time point when an absolute information is transmitted in the transmission period, Mobile_Parameter is an MS-specific value for distributing absolute information transmissions from a plurality of MSs, and mod represents modulo operation.

5. The method of claim 1, further comprising encoding the forward channel status information at a coding rate corresponding to a bit number of the forward channel status information.

6. A transmitter for transmitting forward channel status information to a base station (BS) from a mobile station (MS) in a multi-carrier mobile communication system, comprising:
    a plurality of measurers for measuring strengths of forward channel signals received from the BS by a multi-carrier;
    an average calculator for calculating the average of the strength measurements by compensating the strength measurements for differences among the transmission power of the multi-carrier and calculating an average of the compensated strength measurements; and
    an information generator for generating forward channel status information representing the average strength measurements and transmitting the forward channel status.

7. The transmitter of claim 6, wherein the information generator generates an absolute information representing the calculated average strength measurements in a selected transmission period and generates a relative information representing a difference from a previously calculated average strength measurements in the calculated average strength measurements in a remaining transmission period other than the selected transmission period.

8. The transmitter of claim 6, further comprising an encoder for encoding the forward channel status information at a coding rate corresponding to a bit number of the forward channel status information.

9. The transmitter of claim 8, wherein the encoder encodes an absolute information at a coding rate corresponding to a bit number of the absolute information in a selected transmission period, and encodes a relative information at a coding rate corresponding to a bit number of the relative information in the remaining transmission period other than the selected transmission period.

10. A method of transmitting forward channel status information to a base station (BS) from a mobile station (MS) in a multi-carrier mobile communication system, comprising the steps of:
    measuring strengths of forward channel signals received from the BS by a multi-carrier;
    generating forward channel status information representing each of the signal strength measurements; and
    transmitting the forward channel status information to the BS,
    wherein generating the forward channel status information includes generating absolute information of a selected carrier and relative information of another multi-carrier representing a difference from previously calculated signal strength measurements, respectively, and transmitting the forward channel status information includes transmitting the absolute information and relative information in a selected transmission period.

11. The method of claim 10, wherein generating the forward channel status information further comprises:
    generating a relative information representing a difference from previously calculated signal strength measurements of the multi-carrier respectively, and transmitting the forward channel status information further comprises transmitting the relative information in a remaining period other than in the selected transmission period.

12. The method of claim 10, wherein the absolute information for the multi-carrier is transmitted at an interval determined by $$tx\_interval \le \frac{tx\_period - 1}{Num\_Carrier - 1}$$

where tx_interval represents an interval between transmissions of the absolute information of the multi-carrier, tx_period is a transmission period of the absolute information of each of the multi-carrier, and Num_Carrier is a number of the multi-carrier.

13. The method of claim 10, wherein the absolute information is transmitted if a solution to (T−N−Mobile_Parameter−(carrier_id−1)×tx_period) mod tx_period is 0;

where T is system time represented in a number of slots, tx_period is a transmission period of the absolute information of each of the multi-carrier, N is a time point when the absolute information is transmitted in the transmission period, Mobile_Parameter is an MS-specific value, carrier_id is a carrier identifier, and tx_interval is a transmission interval between the absolute information of the multi-carrier.

14. The method of claim 10, further comprising encoding the forward channel status information at a coding rate corresponding to a bit number of the forward channel status information.

15. A transmitter for transmitting forward channel status information to a base station (BS) from a mobile station (MS) in a multi-carrier mobile communication system, comprising:
    a plurality of measurers for measuring strengths of forward channel signals received from the BS by a multi-carrier;
    a plurality of information generators for generating forward channel status information representing each of the signal strengths; and
    a multiplexer for multiplexing the forward channel status information representing the signal strengths of the multi-carrier respectively and transmitting the forward channel status information,
    wherein each of the information generators generates absolute information of a selected carrier and relative information of another multi-carrier representing a difference from previously calculated signal strength measurements, respectively, in a selected transmission period, and generates relative information representing a difference from previously calculated signal strength measurements of the multi-carrier respectively in a remaining period other than the selected transmission period.

16. The transmitter of claim 15, further comprising an encoder for encoding the forward channel status information at a coding rate corresponding to a bit number of the forward channel status information.

17. The transmitter of claim 16, wherein the encoder encodes an absolute information of a selected carrier and relative information of the other multi-carrier at a coding rate corresponding to a bit number of the absolute information and the relative information in a selected transmission period, and encodes the relative information of the multi-carrier at a coding rate corresponding to a bit number of the relative information respectively in a remaining transmission period other than the selected transmission period.

* * * * *